(12) United States Patent
Ohno et al.

(10) Patent No.: US 8,631,509 B2
(45) Date of Patent: Jan. 14, 2014

(54) CONTENT TRANSMITTING METHOD, CONTENT TRANSMITTING APPARATUS, AND CONTENT RECEIVING APPARATUS

(75) Inventors: Chiyo Ohno, Chigasaki (JP); Hidetoshi Teraoka, Kawasaki (JP); Hiroo Okamoto, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 52 days.

(21) Appl. No.: 13/072,994

(22) Filed: Mar. 28, 2011

(65) Prior Publication Data
US 2011/0247086 A1 Oct. 6, 2011

(30) Foreign Application Priority Data
Apr. 2, 2010 (JP) ................. 2010-085635

(51) Int. Cl.
*H04L 29/06* (2006.01)
(52) U.S. Cl.
USPC ........................................... 726/31; 713/153
(58) Field of Classification Search
None
See application file for complete search history.

(56) References Cited

U.S. PATENT DOCUMENTS

| | | | | |
|---|---|---|---|---|
| 7,296,147 B2* | 11/2007 | Matsuzaki et al. | ............ | 713/155 |
| 7,400,725 B1* | 7/2008 | Yumiba et al. | ................ | 380/201 |
| 7,578,000 B2* | 8/2009 | Kambayashi et al. | .......... | 726/31 |
| 7,877,328 B2* | 1/2011 | Tanaka | ............................ | 705/57 |

FOREIGN PATENT DOCUMENTS

JP  2007-104236  4/2007

* cited by examiner

*Primary Examiner* — Edan Orgad
*Assistant Examiner* — Gita Faramarzi
(74) *Attorney, Agent, or Firm* — Antonelli, Terry, Stout & Kraus, LLP.

(57) ABSTRACT

In a content transmitting method in a content transmitting apparatus, wherein the content transmitting apparatus adds copy control information for indicating to execute a recoding control with either one of "copy can be made only one (1) generation" or "number of times of copying is limited", on number-limited copy target content, when distributing the number-limited copy target content, which can be copied within a region of limited number of pieces.

2 Claims, 28 Drawing Sheets

EQUIPMENT INFORMATION TABLE 50

| ID | EQUIPMENT INFORMATION | | EXTENDED COPY CONTROL INFORMATION PERMISSION/ REFUSAL |
|---|---|---|---|
| | DEVICE ID | ADDRESS INFORMATION (EXAMPLE: IP ADDRESS) | |
| 0 | aabbccddee | 192.168.23.111 | PERMISSION (YES) ~511 |
| 1 | ffgghhiijj | 192.168.23.232 | REFUSAL (NO) ~512 |
| ... | ... | ... | ... |

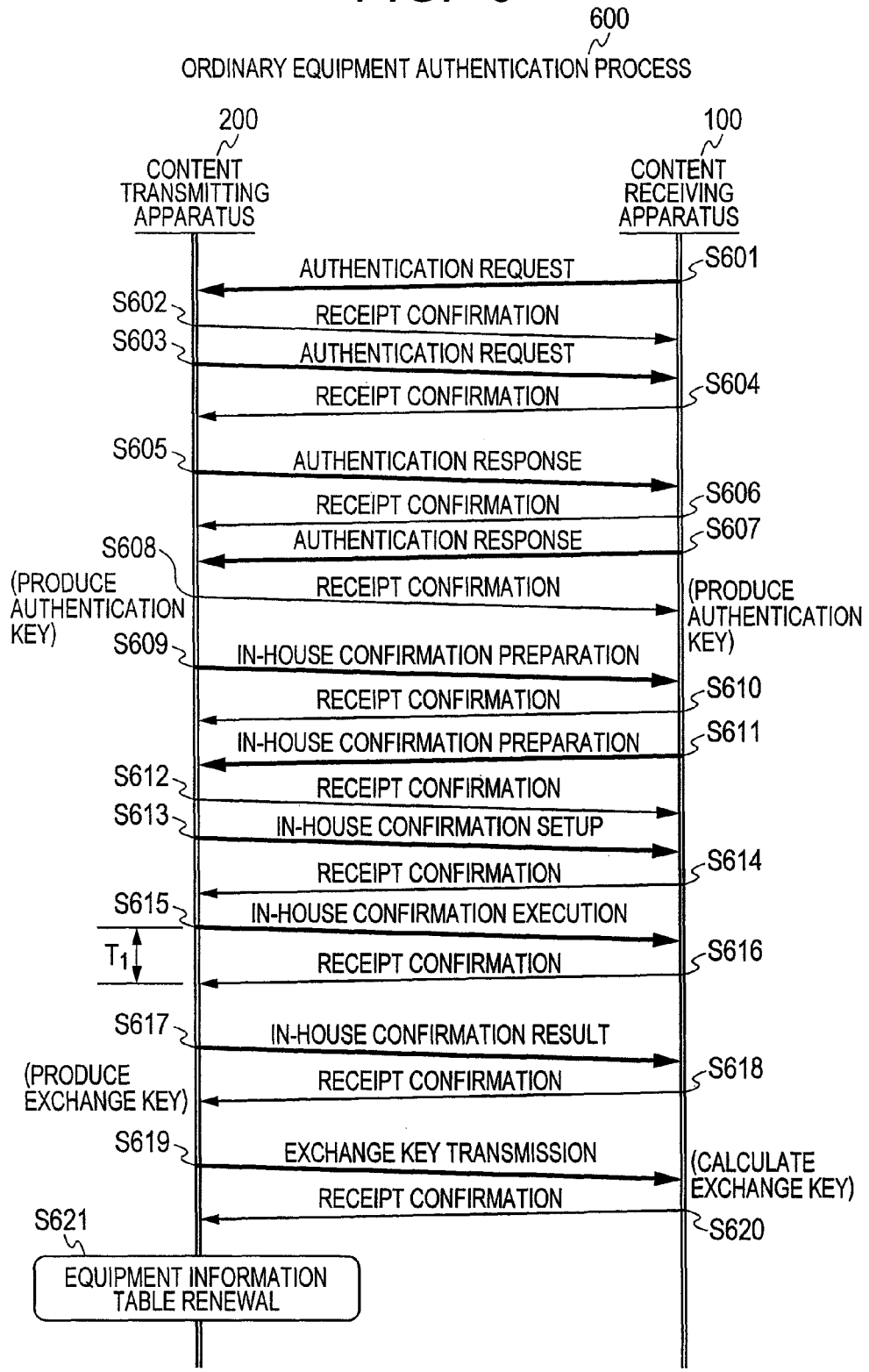

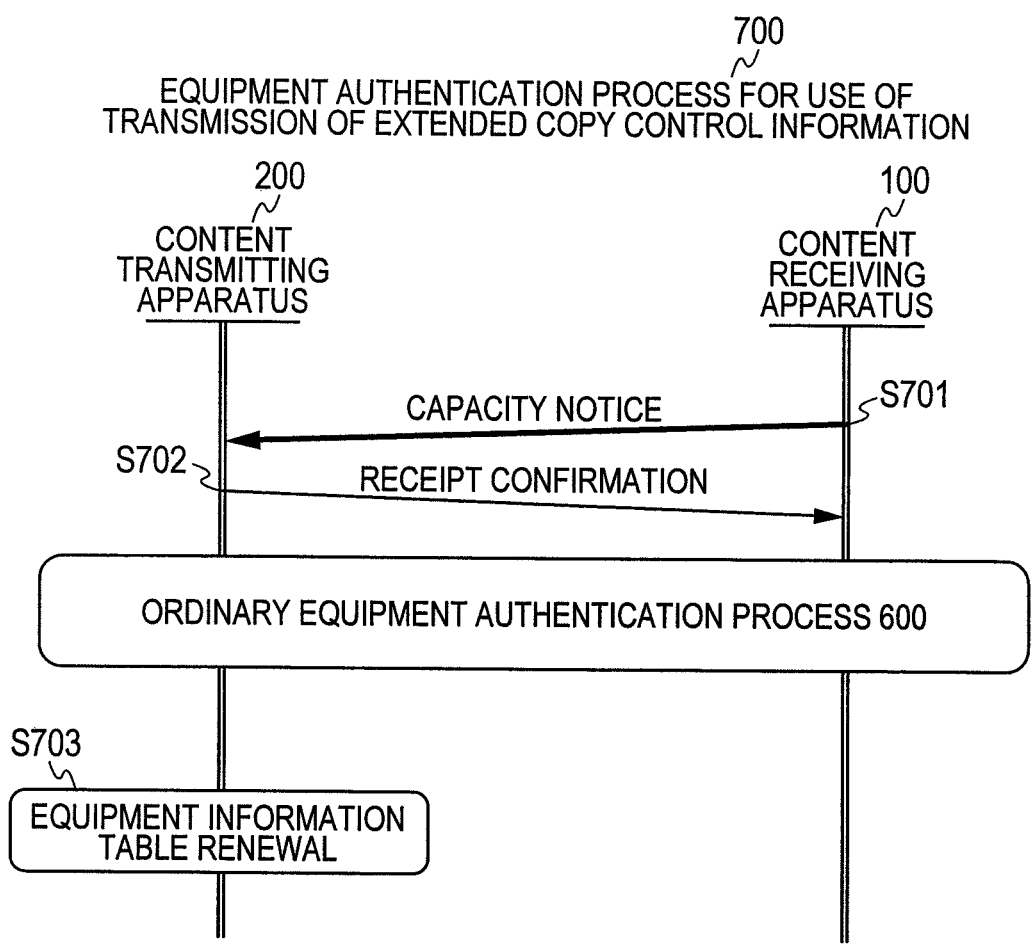

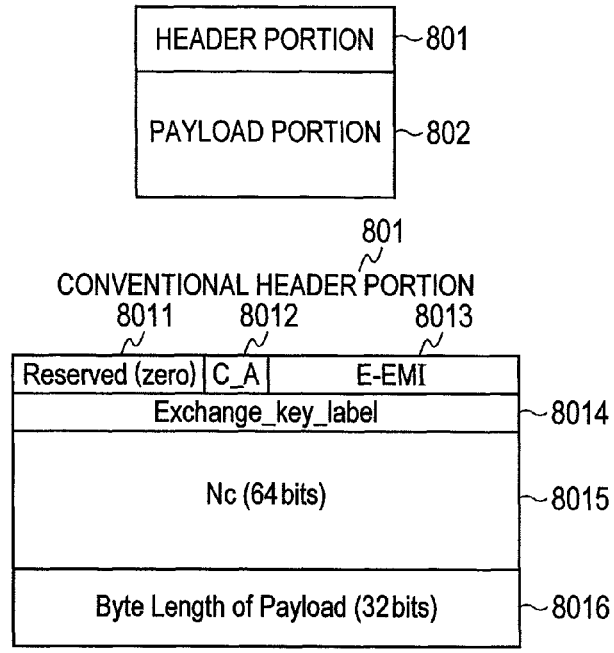
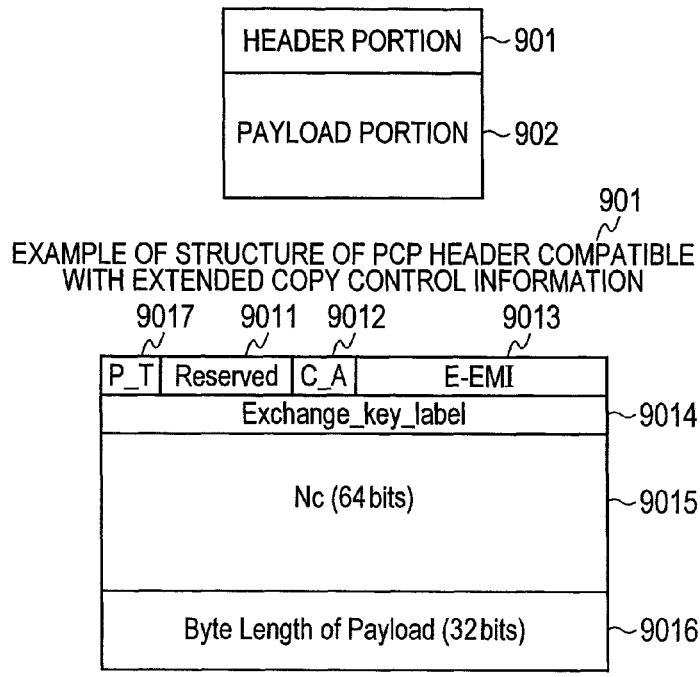

EXAMPLE OF STRUCTURE OF EXTENDED COPY CONTROL INFORMATION

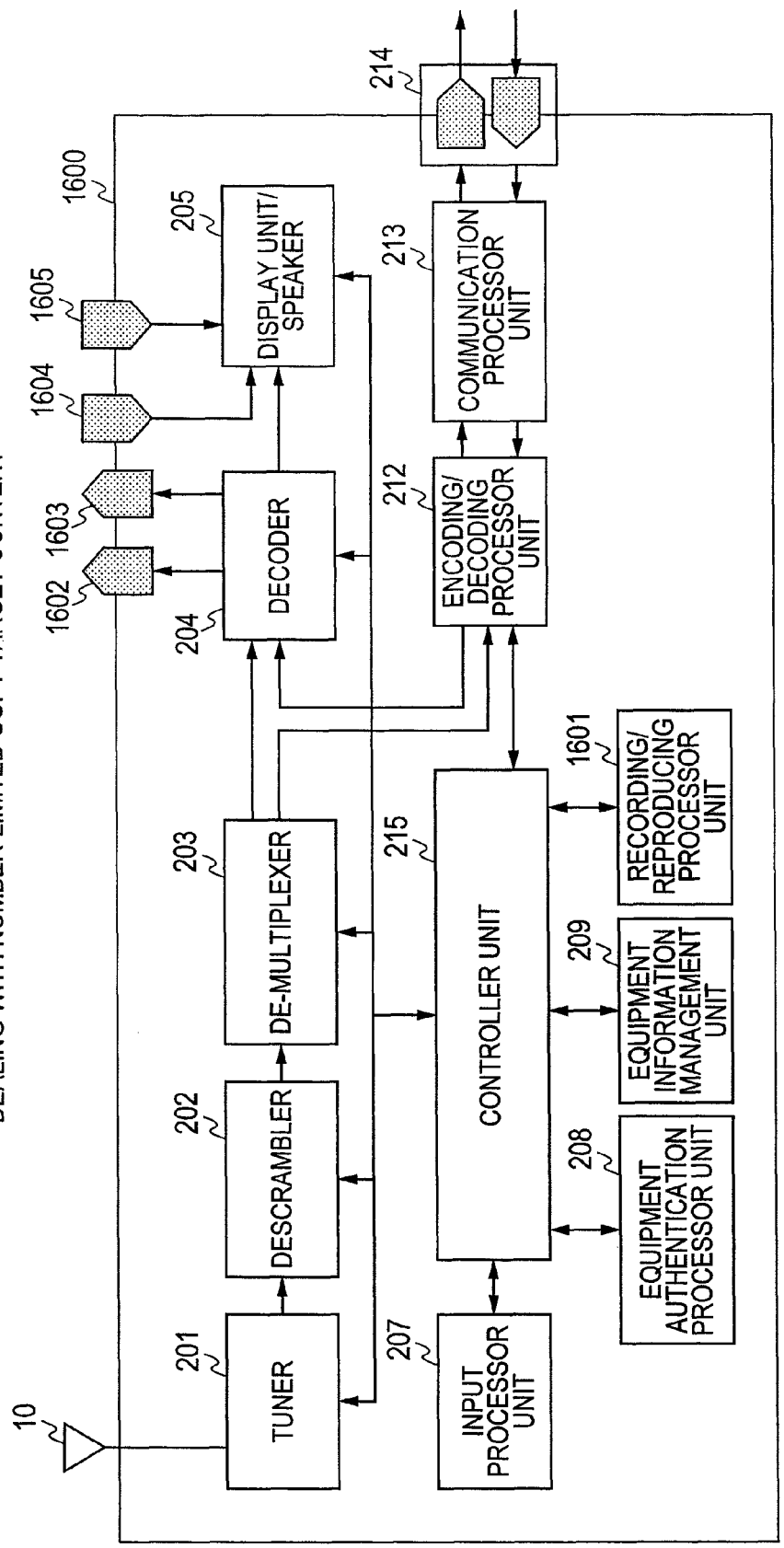

FIG. 17  EXAMPLE OF STRUCTURE OF CONTENT PROTECTION INFORMATION PROVIDED BY CONTENT PROVIDER

1700

| | | |
|---|---|---|
| 1701 | COPY CONTROL METHOD (copy_control_type) | 01: EXECUTION OF DTCP PROTECTION<br>11: NO EXECUTION OF DTCP PROTECTION |
| 1702 | DIGITAL COPY CONTROL INFORMATION (digital_recording_control_data) | 00: COPY CAN BE MADE WITHOUT RESTRICTION CONDITION<br>10: COPY CAN BE MADE ONLY ONE (1) GENERATION<br>11: COPY INHIBITED<br>(01: COPY CANNOT BE MADE AGAIN) |
| 1703 | ANALOG VIDEO OUTPUT CONTROL (APS_control_data) | COPY CONTROL INFORMATION OF ANALOG OUTPUT WHEN COPY CONTROL FORMAT = 01 OR = 11 |
| 1704 | HIGH-SPEED DIGITAL IF OUTPUT PROTECTION (encryption_mode) | 0: EXECUTE OUTPUT PROTECTION ONTO DIGITAL IF, WHEN DIGITAL COPY CONTROL INFORMATION = 00<br>1: NOT EXECUTE OUTPUT PROTECTION ONTO DIGITAL IF, WHEN DIGITAL COPY CONTROL INFORMATION = 00 |
| 1705 | NUMBER-LIMITED COPY (copy_restriction_mode) | 0: NOT APPLY "COPY CAN BE MADE WITH LIMITED NUMBER"<br>1: APPLY "COPY CAN BE MADE WITH LIMITED NUMBER" |
| 1706 | PIECE NUMBER (copy_count) | WHEN NUMBER-LIMITED COPY = 1, NUMBER OF TIMES OF COPYING |

1) copy_control_type = 01, digital_recording_control_data = 10, copy_restriction_mode = 1, copy_count = X
 • TRANSMISSION IS POSSIBLE UNDER "COPY CAN BE MADE ONLY ONE (1) GENERATION", TO APPARATUS NOT COMPATIBLE WITH EXTENDED COPY CONTROL INFORMATION
 • TRANSMISSION IS POSSIBLE UNDER "COPY CAN BE MADE WITH LIMITED NUMBER (ATTACHED WITH NUMBER OF TIMES OF COPYING)" OR "COPY CAN BE MADE ONLY ONE (1) GENERATION", TO APPARATUS COMPATIBLE WITH EXTENDED COPY CONTROL INFORMATION 2) copy_control_type = 01, digital_recording_control_data = 11 (OR 01), copy_restriction_mode = 1, copy_count = X
 • TRANSMISSION IS POSSIBLE UNDER "COPY INHIBITED", TO APPARATUS NOT COMPATIBLE WITH EXTENDED COPY CONTROL INFORMATION
 • TRANSMISSION IS POSSIBLE UNDER "COPY CAN BE MADE WITH LIMITED NUMBER (ATTACHED WITH NUMBER OF TIMES OF COPYING)", TO APPARATUS COMPATIBLE WITH EXTENDED COPY CONTROL INFORMATION

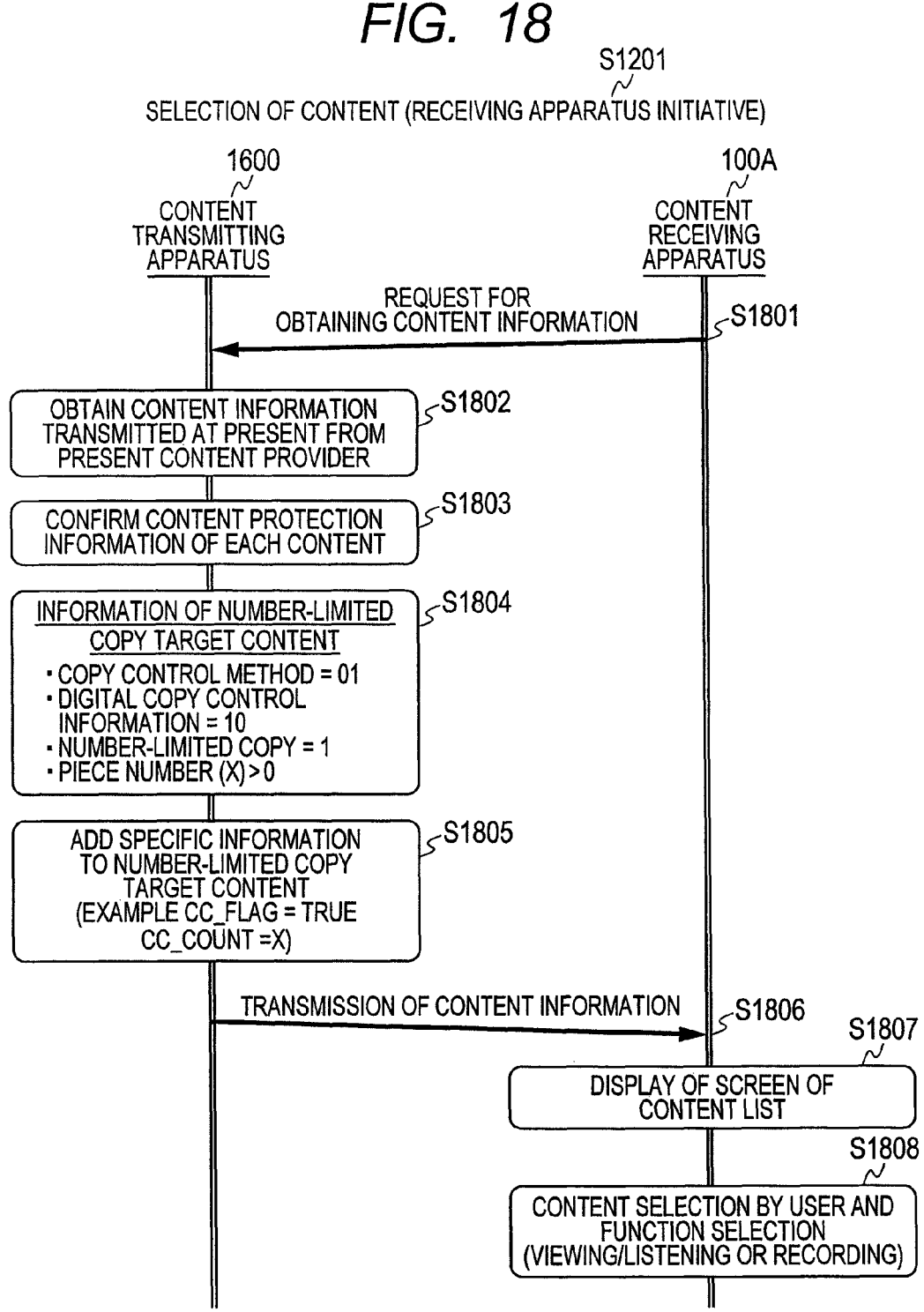

EXAMPLE OF SCREEN OF CONTENT LIST

EXAMPLE OF SCREEN OF CONTENT LIST

EXAMPLE OF SCREEN OF CONTENT LIST

FIG. 31

EXAMPLE OF MAPPING OF CONTENT PROTECTION INFORMATION AND EXTENDED COPY CONTROL INFORMATION

| COPY CONTROL METHOD | DIGITAL COPY CONTROL INFORMATION (digital_recording_control_data) | HIGH-SPEED DIGITAL IF OUTPUT PROTECTION (encryption_mode) | NUMBER-LIMITED COPY (copy_restriction_mode) | E-EMI | EPN | DTCP-CCI |
|---|---|---|---|---|---|---|
| 01 | COPY CAN BE MADE WITHOUT RESTRICTION CONDITION | NO EXECUTE OUTPUT PROTECTION | Don't care | 0000: Copy free | 1 | 00 |
| | | EXECUTE OUTPUT PROTECTION | Don't care | 0010: Copy free with EPN | 0 | 00 |
| | COPY CAN BE MADE ONLY 1 TIME | Don't care | APPLY | 1000: Copy one generation OR 0011: Copy count | encryption_mode | 10 |
| | | Don't care | NOT APPLY | 1000: Copy one generation | encryption_mode | 10 |
| | COPY CANNOT BE MADE AGAIN | Don't care | Don't care | 0100: No more copies | encryption_mode | 01 |
| | 11: COPY INHIBITED | Don't care | Don't care | 1100: Copy Never | encryption_mode | 11 |
| 11 | 00: COPY CAN BE MADE WITHOUT RESTRICTION CONDITION | Don't care | Don't care | 0000: Copy free | OUTPUT CANNOT BE MADE | 00 |
| | 10: COPY CAN BE MADE ONLY 1 TIME | Don't care | Don't care | OUTPUT CANNOT BE MADE | OUTPUT CANNOT BE MADE | OUTPUT CANNOT BE MADE |
| | COPY CANNOT BE MADE AGAIN | Don't care | Don't care | OUTPUT CANNOT BE MADE | OUTPUT CANNOT BE MADE | OUTPUT CANNOT BE MADE |
| | 11: COPY INHIBITED | Don't care | Don't care | OUTPUT CANNOT BE MADE | OUTPUT CANNOT BE MADE | OUTPUT CANNOT BE MADE |

FIG. 32  EXAMPLE OF MAPPING OF CONTENT PROTECTION INFORMATION AND EXTENDED COPY CONTROL INFORMATION 3200

| COPY CONTROL METHOD | DIGITAL COPY CONTROL INFORMATION (digital_recording_control_data) 1701 | HIGH-SPEED DIGITAL IF OUTPUT PROTECTION (encryption_mode) 1702 | NUMBER-LIMITED COPY (copy_restriction_mode) 1704 | E-EMI 1705 | EPN 9013 | DTCP-CCI 10034 10035 |
|---|---|---|---|---|---|---|
| 01 | COPY CAN BE MADE WITHOUT RESTRICTION CONDITION | NO EXECUTE OUTPUT PROTECTION | Don't care | 0000: Copy free | 1 | 00 |
|  |  | EXECUTE OUTPUT PROTECTION | Don't care | 0010: Copy free with EPN | 0 | 00 |
|  | COPY CAN BE MADE ONLY 1 TIME | Don't care | Don't care | 1000: Copy one generation | encryption_mode | 10 |
|  | COPY CANNOT BE MADE AGAIN | Don't care | APPLY | 0100: No more copies | encryption_mode | 01 |
|  |  |  | NOT APPLY | 1100: Copy Never OR 0011: Copy count | encryption_mode | 11 |
|  | COPY INHIBITED | Don't care | Don't care | 1100: Copy Never | encryption_mode | 11 |
| 11 | 00: COPY CAN BE MADE WITHOUT RESTRICTION CONDITION | Don't care | Don't care | 0000: Copy free | OUTPUT CANNOT BE MADE | 00 |
|  | COPY CAN BE MADE ONLY 1 TIME | Don't care | Don't care | OUTPUT CANNOT BE MADE | OUTPUT CANNOT BE MADE | OUTPUT CANNOT BE MADE |
|  | COPY CANNOT BE MADE AGAIN | Don't care | Don't care | OUTPUT CANNOT BE MADE | OUTPUT CANNOT BE MADE | OUTPUT CANNOT BE MADE |
|  | COPY INHIBITED | Don't care | Don't care | OUTPUT CANNOT BE MADE | OUTPUT CANNOT BE MADE | OUTPUT CANNOT BE MADE |

CONTENT TRANSMITTING METHOD, CONTENT TRANSMITTING APPARATUS, AND CONTENT RECEIVING APPARATUS

This application relates to and claims priority from Japanese Patent Application No. 2010-085635 filed on Apr. 2, 2010, the entire disclosure of which is incorporated herein by reference.

BACKGROUND OF THE INVENTION

The present invention relates to a transmitting apparatus, a receiving apparatus and a content transmitting method, being preferable for protecting a copyright of the content to be transmitted, when sending/receiving the contents, such as, video/audio, etc., through a network.

When transmitting contents between digital AV apparatuses, encoding is executed on a content transmitting apparatus side, while sharing information for decoding, commonly, between a content receiving apparatus side, so that the content cannot be received by equipment other than the content receiving apparatus, as a transmission address, correctly, and thereby implementing a copy protect for preventing limitless copying thereof.

As an example of such copy protect, which was already applied in a digital AV apparatus, is already know a method described in Japanese Patent Laying-Open No. 2007-104236, for example. With the method described in this Patent Document 1, contents are classified into, "no copy limit", "copy once" and "copy inhibited", to be managed, and on a recording apparatus, only the contents of "no copy limit" and "copy once" are recorded, while the content of "copy once" is treated as "no more copy" after recording it once, and they are transmitted after being treated with an encoding process on a transmitter side, but excepting the content of "no copy restriction", on a content transmission through a wired or wireless-network; thereby protecting the contents from limitless copying thereof. Also, in this method are disclosed a method of inserting copy control information into the content, and a method of transmitting a part of the copy control information after describing it in a header portion of a transmission packet.

SUMMARY OF THE INVENTION

In the conventional technology mentioned above, the copy control information about the content of a target of copyright protection is buried in the header portion of the content transmission packet or within the content, or in both of them, and is transmitted.

However, in recent years, content allowed to be copied by a finite number of times, and/or content determined with a content viewing/listening time-period thereof, which are not expected before, begin to be distributed.

In case where the copy control information extended in such a manner (hereinafter, an extended copy control information) is attached to the content of the copyright protection target, with a format, which is defined in accordance with the method mentioned above, there is a problem that all of the copy control information cannot be transmitted due to a limit of a header size, etc.

According to the present invention, an object thereof is to provide a content transmitting apparatus, a content receiving apparatus and a content transmitting method, for enabling to transmit the copy control information, including therein a number of times of copying and/or a viewing/listening time-period, etc., when transmitting contents with using a wired or a wireless LAN.

For dissolving the problem(s) mentioned above, there is provided a content transmitting method for transmitting contents to content receiving apparatuses, being connected through a network, being characterized in that, before transmitting content to be a target of the copy control information, a packet including that copy control information is sent or transmitted, as a packet other than that content, on a session of the same application layer.

With the mentioned above, it is possible to transmit the extended copy control information, including therein the number of times of copying and/or the limit of viewing/listening, etc.

BRIEF DESCRIPTION OF THE DRAWINGS

Those and other objects, features and advantages of the present invention will become more readily apparent from the following detailed description when taken in conjunction with the accompanying drawings wherein:

FIG. 6 is a view for showing an example of sequences of an equipment process authentication process, executed between the content receiving apparatus and the content transmitting apparatus;

FIG. 7 is a view for showing an example of sequences of an equipment process authentication process for use of extended copy control information, executed between the content receiving apparatus and the content transmitting apparatus;

FIG. 8 is a view for showing a packet format when transmitting the content;

FIG. 9 is a view for showing a packet format when transmitting the content for use of the extended copy control information;

FIG. 16 is a graphic view for showing an example of the structures of a content receiving apparatus;

FIG. 17 is a view for showing an example of the structures of content protection information, which is provided by a content distributing apparatus;

FIG. 18 is a view for showing an example of a sequence of processes for the content receiving apparatus to obtain content information from the content transmitting apparatus;

FIG. 31 is a view for showing an example of one (1) mapping structure between the content protection information and the extended copy control information; and FIG. 32 is a view for showing an example of one (1) mapping structure between the content protection information and the extended copy control information.

DETAILED DESCRIPTION OF THE PREFERRED EMBODIMENTS

Hereinafter, embodiments according to the present invention will be fully explained by referring to the attached drawings.

Embodiment 1

Figure 1:
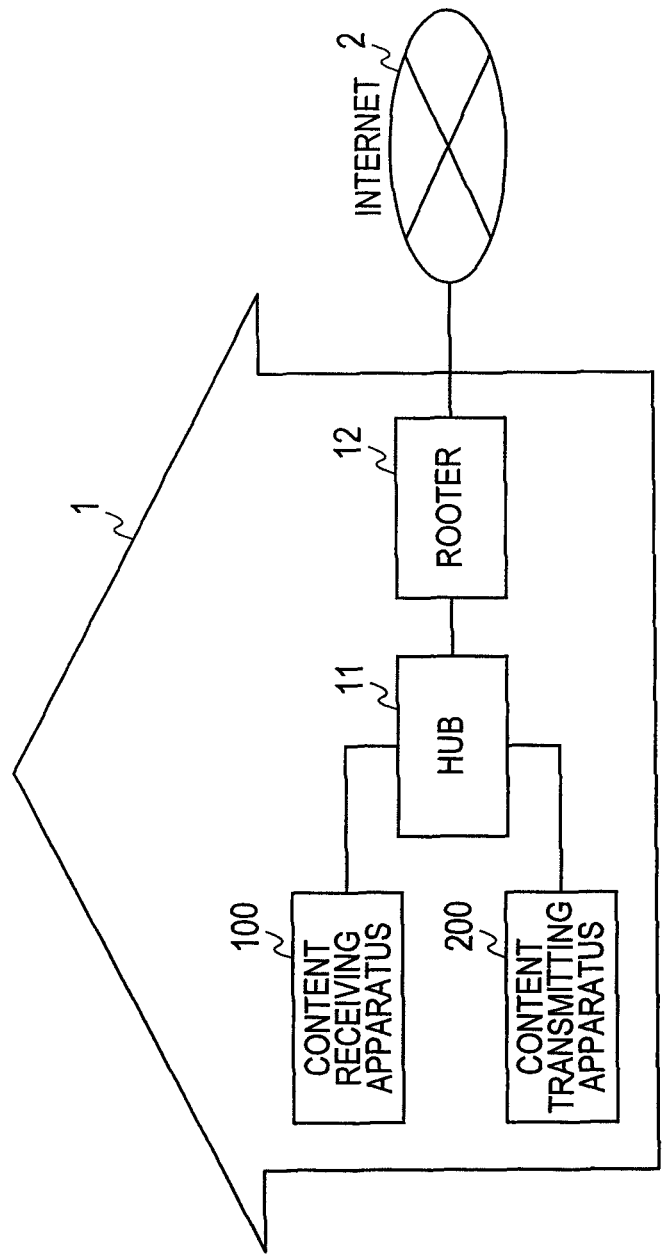
FIG. 1 is a graphic view for showing an example of the structures of a system.

FIG. 1 shows an example of a system configuration or structure. In a user's house 1, a content transmitting apparatus 200 and a content receiving apparatus 100 are connected to a network hub device 11, respectively, through cables of a wired LAN, and the network hub device 11 is connected to a rooter 12. The rooter 12 is connected with Internet 2, through a modem, a photo-electric converter, etc.

Within the LAN (Local Area Network), as a network protocol is used a standard IP (Internet Protocol), and as an upper transport protocol are used a TCP (Transmission Control Protocol) and a UDP (User Datagram Protocol). For transmission of contents, there is/are further used, for example, RTP (Real-time Transport Protocol) and/or HTTP (Hyper Text Transfer Protocol), FTP (File Transfer Protocol), etc. However, the IP is available, as IPv4 and IPv6, differing in the version thereof; however, the present invention should not be limited to either one of them.

The content transmitting apparatus 200, the content receiving apparatus 100 and the rooter 12 have IP addresses, each for identifying itself on the LAN, respectively. And, to an interface portion of each network communication processor circuit is given a MAC (Media Access Control) address of 48 bits. For setting up an IP address to each apparatus, it is preferable to operate the rooter 12, for example, by means of DHCP (Dynamic Host Configuration Protocol), and thereby distributing the IP address for each apparatus from here.

However, in case of using the IPv6 (Internet Protocol Version 6) therein, it is possible for each apparatus to determine the IP address of itself, from upper 64 bits of the IP address of the rooter 12 and the MAC address, through a method called by a stateless automatic setup.

Herein, in FIG. 1, connection between the equipments is made by the wired LAN, within the user's house; but in the place thereof may be uses a LAN adopting a raid access point, etc. Also, the hub 11 and the rooter 12 may be within one body in the configurations thereof.

Figure 2:
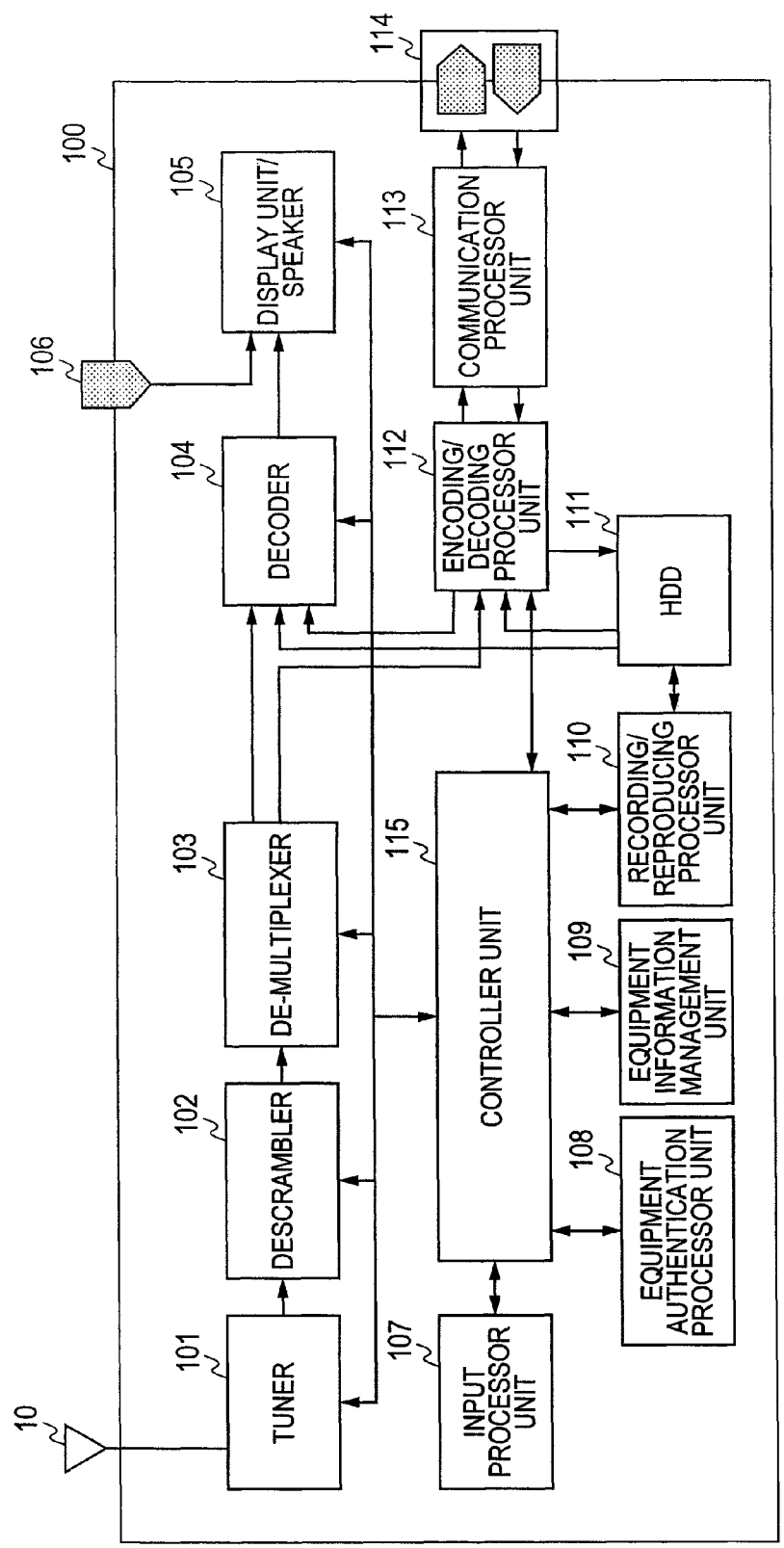
FIG. 2 is a graphic view for showing an example of the structures of a content receiving apparatus.

FIG. 2 shows an example of the structures of the content receiving apparatus 100.

The content receiving apparatus 100 is built up with a tuner 101, a descrambler 102, a de-multiplexer 103, a decoder 104, a display/speaker 105, digital terminals 106, an input processor unit 107, an equipment authentication processor unit 108, an equipment information management unit 109, a recording/reproducing processor unit 110, a HDD 111, an encoding/decoding processor unit 112, a communication processor unit 113, digital input/output terminals 114 and a controller unit 115.

The tuner 101 selects a channel desired from plural numbers of channels, which are received from a broadcast station through an antenna 10, and demodulates a program modulated digitally.

The descrambler 102 removes a scramble of program put thereon, for enabling to receive, but only a channel (s), on which a contract is made with a service provider.

The de-multiplexer 103 extracts from a broadcast program, audio data and video data.

The decoder 104 decodes compressed audio data and/or video data received from the broadcast program and/or the digital input/output terminals 114, and thereby extend it/them into original audio signal and/or video signal.

The display/speaker 105 reproduces an output signal from the said decoder 104, or a signal inputted from the digital terminals 106. This may be, not be built-in, but attached on an outside (i.e., externally).

The digital terminals 106 may be a HDMI (High-Definition Multimedia Interface), etc., for example, for inputting un-compressed digital data therein.

The input processor unit 107 operates the content receiving apparatus 100 with using a remote controller and/or touch panels by a user.

The equipment authentication processor unit 108 authenticates if they each other are equipments regularly approved or not, in accordance with a specific authentication protocol, between other AV equipment, for transmitting contents of the copyright protection target through the LAN, and shares a key for use of encoding/decoding contents with each other. As the specific authentication protocol can be listed up a DTCP (Digital Transmission Content Protection) method, etc., for example.

The equipment information management unit 109 manages therein the information relating to AV equipments, each succeeding the authentication in the equipment authentication processor unit 108.

The recording/reproducing processor unit 110 executes a recording control for recording the contents on the HDD 111, and a reproducing control for reproducing the contents recorded on the HDD 111.

The HDD 111 is a built-in memory for recording the broadcast program (s). Other than that, it may be a detachable HDD, an optical disc or a memory card, and may be a hybrid configuration of combining those or the like.

The encoding/decoding processor unit 112 encodes or decodes the broadcast program or the contents received through the digital input/output terminals 114 via LAN, with using the key, which is shared with in the equipment authentication processor unit 108, and also it produces or analyzes a packet to be transmitted to the network.

The communication processor unit 113 transmits/receives the contents and/or the control commands through the digital input/output terminals 114, between other AV equipments connected through the LAN. The content to be received is added with copy control information, such as, a number of times of copying and/or a time-period of viewing/listening, etc., in addition to discrimination codes, such as, "no copy limit", "copy once", "copy inhibited" or "no more copy", etc., indicating a manner of dealing with.

The digital input/output terminals 114 input/output the contents and/or the control commands through the LAN.

The controller unit 115 controls an operation of each part or unit within the content receiving apparatus 100, totally or integrally.

Figure 3:
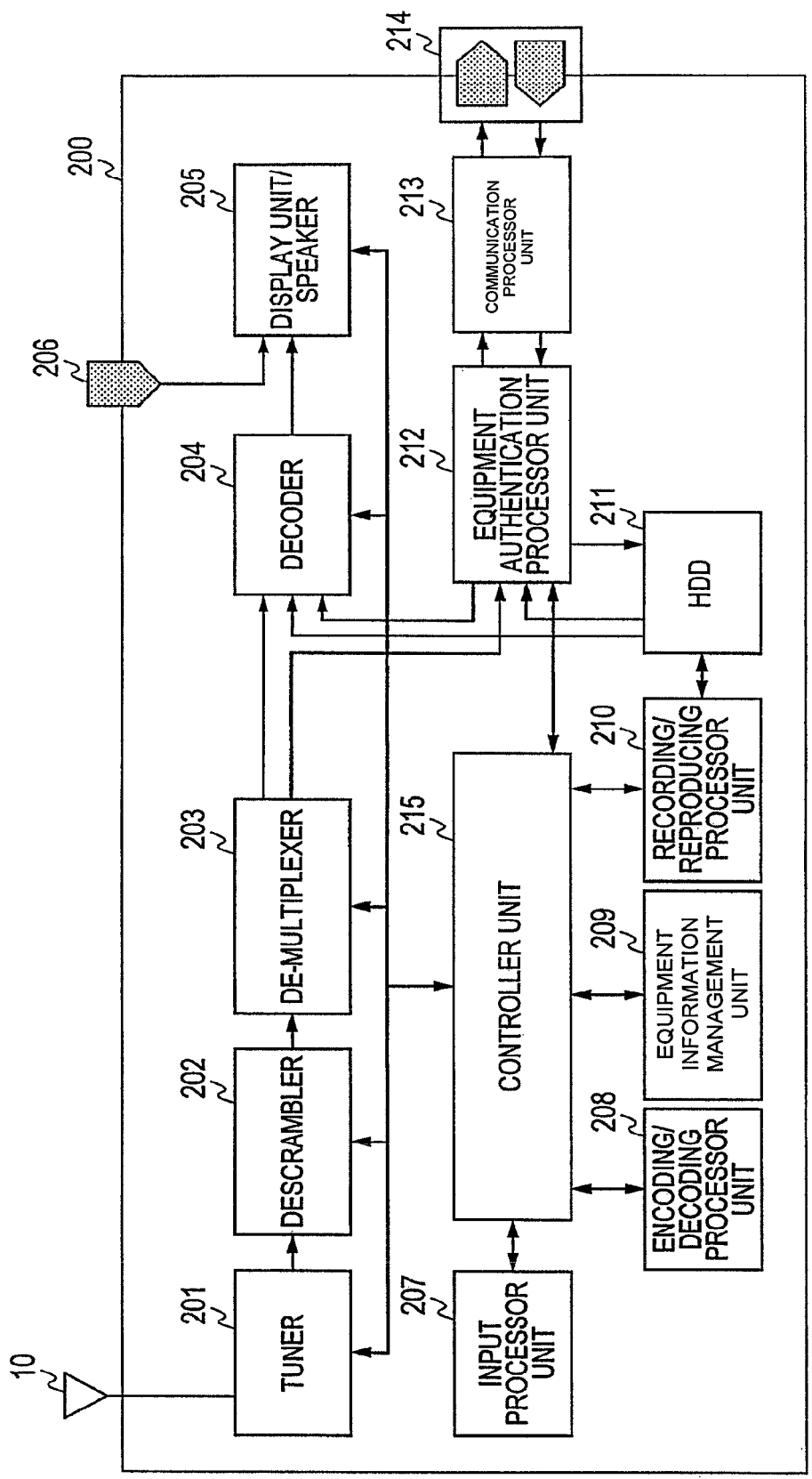
FIG. 3 is a graphic view for showing an example of the structures of a content transmitting apparatus.

FIG. 3 shows an example of the structures of the content transmitting apparatus 200.

The content transmitting apparatus 200 is build up with a tuner 201, a descrambler 202, a de-multiplexer 203, a decoder 204, a display/speaker 205, digital terminals 206, an input processor unit 207, an equipment authentication processor unit 208, an equipment information management unit 209, a recording/reproducing processor unit 210, a HDD 211, an encoding/decoding processor unit 212, a communication processor unit 213, digital input/output terminals 214 and a controller unit 215.

The tuner 201 selects a channel desired from plural numbers of channels, which are received from a broadcast station through an antenna 20, and demodulates a program modulated digitally.

The descrambler 202 removes a scramble of programput thereon, for enabling to receive only a channel(s), on which a contract is made with a service provider.

The de-multiplexer 203 extracts from a broadcast program, audio data and video data.

The decoder 204 decodes compressed audio data and/or video data received from the broadcast program and/or the digital input/output terminals 214, and thereby extend it/them into original audio signal and/or video signal.

The display/speaker 205 reproduces an output signal from the said decoder 204, or a signal inputted from the digital terminals 206. This may, not be built-in, but be attached on an outside.

The digital terminals 206 may be a HDMI (High-Definition Multimedia Interface), etc., for example, for inputting un-compressed digital data therein.

The input processor unit 207 operates the content transmitting apparatus 200 with using a remote controller and/or touch panels by a user.

The equipment authentication processor unit 208 authenticates if they each other are equipments regularly approved or not, in accordance with a specific authentication protocol, between other AV equipment, for transmitting contents of the copyright protection target through the LAN, and shares a key for use of encoding/decoding contents with each other. As the specific authentication protocol can be listed up the DTCP method, etc., for example.

The equipment information management unit 209 manages therein the information relating to AV equipments, each succeeding the authentication in the equipment authentication processor unit 208.

The recording/reproducing processor unit 210 executes a recording control for recording the contents on the HDD 211, and a reproducing control for reproducing the contents recorded on the HDD 211.

The HDD 211 is a built-in memory for recording the broadcast program (s). Other than that, it may be a detachable HDD, an optical disc or a memory card, and may be a hybrid configuration of combining those or the like.

The encoding/decoding processor unit 212 encodes or decodes the broadcast program or the contents received through the digital input/output terminals 214 via LAN, with using the key, which is shared with in the equipment authentication processor unit 208, and also it produces or analyzes a packet to be transmitted to the network.

The communication processor unit 213 transmits/receives the contents and/or the control commands through the digital input/output terminals 214, between other AV equipments connected through the LAN. The content to be received is added with copy control information, such as, a number of times of copying and/or a time-period of viewing/listening, etc., in addition to discrimination codes, such as, "no copy limit", "copy once", "copy inhibited" or "no more copy", etc., indicating a manner of dealing with, to be transmitted.

The digital input/output terminals 214 input/output the contents and/or the control commands through the LAN.

The controller unit 215 controls an operation of each part or unit within the content transmitting apparatus 200, totally or integrally.

Figures 4, 5:
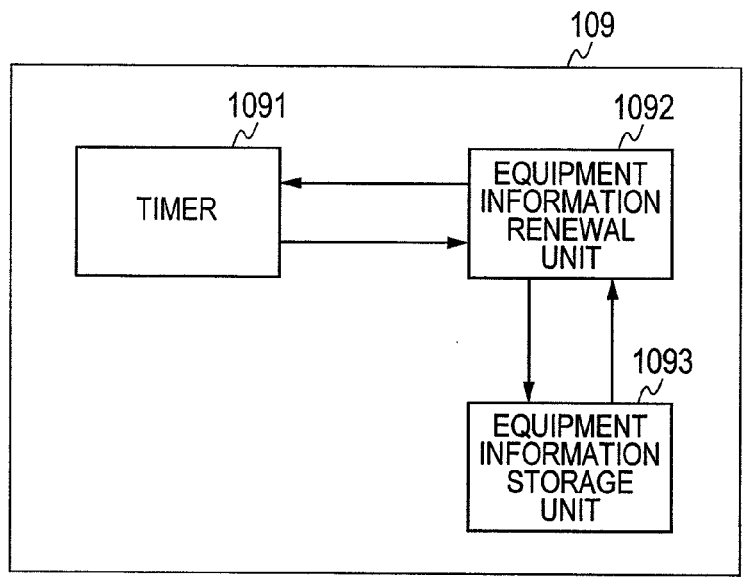
FIG. 4 is a graphic view for showing an example of the structures of an equipment information management unit.
FIG. 5 is a graphic view for showing an example of the structures of an equipment information table.

FIG. 4 shows an example of the structure of the equipment information management unit 109 in each equipment (209 is also similar to).

The equipment information management unit 109 is built up with a timer 1091, an equipment information renewal unit 1092 and an equipment information storage unit 1093.

The timer 1091 executes a time-measurement, in case when confirming the equipment of the other part of authentication is in the house or not within the equipment authentication processor unit 108, or in case when managing an effective time period of registration information stored in the equipment information storage unit 1093, which will be mentioned later.

The equipment information renewing unit 1092 manages the effective time-period of the registration information, which is held in the equipment information storage unit 1093, which will be mentioned later, and executes registration/renewal/deletion depending on necessity thereof.

The equipment information storage unit 1093 holds the information relating to the other part of authentication, when the authentication on equipment is succeeded in the equipment authentication processor unit 108.

FIG. 5 shows an example of the structures of an equipment information table 50 to be stored in the equipment information storage unit 1093.

The equipment information table 50 is built up with an ID 501, device ID S021 and address information S022, as the equipment information 502, and an extended copy control information receipt permission/refusal 503.

The ID 501 indicates a registration number of the table 50.

The device ID S021 indicates an identifier for identifying each of the equipments, uniquely. For example, it may be the information unique for equipment, which is produced by a specific authentication institute or body and is reserved in a non-volatile memory in advance when manufacturing each of the equipments, such as, a unique ID to be used in IEEE 1394, and/or a device ID to be used in DTCP, etc., and it has a unique value for each of the equipments. It may includes therein, the information of the a publication key, etc.

The address information S022 indicates the IP address or the MAC address, etc., of each of the equipments on the network.

The extended copy control information receiving permission/refusal indicates presence/absence of capability of receiving the extended copy control information of a target device.

FIG. 6 shows an example of a step 600 of processes for authenticating equipment to be executed between the content transmitting apparatus 200 and the content receiving apparatus 100, in the system structures or configuration shown in FIG. 1.

Herein, in transmission/reception of the information for the equipment authentication process is used TCP, as a protocol thereof, and wherein, when various kinds of information are transmitted, such as, an authentication request to the apparatus of the other part and an authentication response thereto, etc., confirmation of reception to this is turned back from the apparatus of the other part, and thereby there is maintained or built up a communication path, with which a transmission error can be detected.

Further, in FIG. 6 is omitted the data transmission for establishing a connection and abandon thereof by the TCP.

First of all, an authentication request or command is produced from a side of the content receiving apparatus 100. The equipment authentication processor unit 108 of the content receiving apparatus 100 attaches the information unique for equipment including the device ID, and a certificate for that information, to the authentication request, and sends them to the content transmitting apparatus 200 through the communication processor unit 113 (S601).

The equipment authentication processor unit 208 of the content transmitting apparatus 200, when receiving the authentication request through the communication processor unit 213 and transmits a confirmation of reception to the content receiving apparatus 100 (S602), produces an authentication request from a side of itself, and similar to the case of the content receiving apparatus, it transmits the authentication request to the content receiving apparatus 100, with attaching the unique information of the content transmitting apparatus 200 and a certificate thereof to it (S603).

The equipment authentication processor unit 108 of the content receiving apparatus 100 receives the authentication request, and transmits a confirmation of reception thereof to the content transmitting apparatus 200 (S604).

Next, the equipment authentication processor unit 208 of the content transmitting apparatus 200 checks each of the information received upon the authentication request, and transmits an authentication response, attached with parameters necessary for producing key information, to the content receiving apparatus 100 (S605).

The equipment authentication processor unit 108 of the content receiving apparatus 100, after receiving the authentication response and transmitting the confirmation of reception thereof to the content transmitting apparatus 200 (S606), produces an authentication response from a side of itself, and also transmits the authentication response attached with the parameters necessary for producing the key information, similar to the case of the content transmitting apparatus, to the content transmitting apparatus 200 (S607), and then produces an authentication key common with the content transmitting apparatus 200 with using the parameters necessary therefor.

The equipment authentication processor unit 208 of the content transmitting apparatus 200 receives the authentication response, and also transmits a confirmation of receipt thereof to the content receiving apparatus 100 (S608), and similar to the content receiving apparatus, it produces the authentication key common with the content receiving apparatus 100 with using the parameters necessary therefor.

In those steps mentioned heretofore, within the authentication processor unit 108 of the content receiving apparatus 100 and the authentication processor unit 208 of the content transmitting apparatus 200, the authentication key common with each other is produced and is shared with.

Next, the content transmitting apparatus 200, for confirming on whether the content receiving apparatus 100 is the equipment existing in the house or not, transmits that a preparation is executed for confirming to be in-house, to the content receiving apparatus 100 (S609).

The authentication processor unit 108 of the content receiving apparatus 100, after receiving a notice of preparation for confirming to be in-house and transmitting a confirmation of receipt thereof to the content transmitting apparatus 200 (S610), produces a notice of preparation for confirming to be in-house (i.e., an in-house confirmation preparation notice), and transmits it to the content transmitting apparatus 200 (S611).

The equipment authentication processor unit 208 of the content transmitting apparatus 200, when receiving the notice in-house confirmation preparation and transmitting a confirmation of receipt thereof (S612), then transmits an in-house confirmation setup request, attached with information necessary for confirming to be in-house, to the content receiving apparatus 100 (S613).

The authentication processor unit 1088 of the content receiving apparatus 100 receives the in-house confirmation setup request, and conducts preparation necessary for in-house confirmation, and then it transmits a confirmation of receipt thereof to the content transmitting apparatus 200 (S614).

The equipment authentication processor unit 208 of the content transmitting apparatus 200, receiving the confirmation of receipt, after starting the timer 1081 in the equipment information management unit 209, transmits an in-house confirmation execution request for confirming that the content receiving apparatus 100 is in-house, to the content receiving apparatus 100 (S615).

The authentication processor unit 108 of the content receiving apparatus 100 receives the in-house confirmation execution request, and transmits a confirmation of receipt thereof to the content transmitting apparatus (S616).

The equipment authentication processor unit 208 of the content transmitting apparatus 200, when receiving the confirmation of receipt, stops the timer 1081, and confirms that a measurement value (T1) from when issuing the in-house confirmation execution request up to when receiving the confirmation of receipt thereof does not exceed a predetermined value (T). In case where the measurement value (T1)≤the predetermined value (T), determination is made that the content receiving apparatus 100 exists in house, and that it is the apparatus existing within a range of a personal use, and this is transmitted to the content receiving apparatus 100 as a result of in-house confirmation (S617).

On the other hand, where the measurement value (T1)>the predetermined value (T), determination is made there is a possibility that the content receiving apparatus 100 exists an outside of the house, and then processes thereafter are interrupted, and the equipment confirmation process is ended. The authentication processor unit 108 of the content receiving apparatus 100 receiving the result of the in-house confirmation, when transmits a confirmation of receipt thereof (S618), produces an exchange key to be used when the equipment authentication processor unit 208 of the content transmitting apparatus 200 encodes contents, and encodes the exchange key with using the authentication key, and then transmit it to the content receiving apparatus 100 together with the ID for discriminating that exchange key (S619).

The equipment authentication processor unit 108 of the content receiving apparatus 100 decodes the exchange key transmitted from the content transmitting apparatus 200 with using the authentication key, and transmits a confirmation of receipt thereof (S620).

The equipment authentication processor unit 208 of the content transmitting apparatus 200, when receiving the confirmation of receipt, registers the information relating to the content receiving apparatus 100 onto an equipment information table 510 within the communication processor unit 213 (S621).

For example, as is shown in a record 512 of ID 501 within the equipment information table 510, the device ID of the content receiving apparatus 100, which is received in S601, is set to a device ID S021, and the IP address of the content receiving apparatus 100 on the network is set to address information S022, and further "No" is set to the extended copy control information receipt permission/refusal 503.

From the above-mentioned, the equipment authentication processor unit 208 of the content transmitting apparatus 200 and the equipment authentication processor unit 108 of the content receiving apparatus 100 share the common exchange key with each other. The exchange key is used for producing a common key for encoding/decoding the content. For producing the above-mentioned authentication key, exchange key and common key may be utilized well-known key producing/key exchanging algorithms, respectively. Also, the processes in S609 and S613 and the processes in S617 and S619 may be combined with, respectively.

The steps mentioned above are explained as the equipment authentication process to be executed between the content transmitting apparatus 200 and the content receiving apparatus 100, when executing transmission of content within the house.

Thus, by executing the steps mentioned above, it is possible to confirm to be the regularly authorized equipment with each other between the apparatuses, and to share the key(s) to be used for encoding/decoding the content.

FIG. 7 shows an example of the steps of the equipment authentication process for use of enabling the extended copy control information, to be executed between the content transmitting apparatus 200 and the content receiving apparatus 100, in the system configuration or structures shown in FIG. 1.

First of all, the equipment authentication processor unit 108 of the content receiving apparatus 100 transmits a capacity notice indicative of being able to receive the extended copy control information on the apparatus itself, through the communication processor unit 113 (S701).

The equipment authentication processor unit 208 of the content transmitting apparatus 200 receives the capacity notice through the communication processor unit 213, and transmits a confirmation of receipt, indicating that the apparatus itself is able to transmit the extended copy control information therefrom, to the content receiving apparatus 100 (S702).

Next, the content transmitting apparatus 200 and the content receiving apparatus 100 execute the equipment authentication process 600, which is explained in FIG. 6.

The equipment authentication processor unit 208 of the content transmitting apparatus 200, when the equipment authentication process 600 is completed, registers the information relating to the content receiving apparatus 100 onto the equipment information table 510 within the equipment information management unit 209 (S703). For example, as is shown in a record 511 of ID 501 within the equipment information table 510, the device ID of the content receiving apparatus 100, which is received in S601, is set to the device ID S021, and the IP address of the content receiving apparatus 100 on the network is set to the address information S022, and further "Yes" is set to the extended copy control information receipt permission/refusal 503.

Executing the steps mentioned above, between the apparatuses, it is possible to share the key (s), commonly, to be used for encoding/decoding the content, while confirming them to be the regularly authorized equipment, with each other, as well as, to be able with transmission of the extended copy control information or not.

FIG. 8 shows an example of a content transmission packet format 800.

A content transmission packet is constructed with a header portion 801 and a payload portion 802.

The header portion 801 is constructed with a reservation region (Reserved) 8011, an encoding method (C_A) 8012, an encoding mode (E_EMI) 8013, an exchange key label (Exchange_Key_Label) 8014, a random number (Nc) 8015 and a payload size (Byte Length of Payload) 8016.

The reservation region (Reserved) 8011 is a region for reservation, and "000" is set thereto.

The encoding method (C_A) 8012 indicates an encoding method of the payload portion. For example, there is indicated that the encoding is made by AES of key length of 128 bits, etc.

The encoding mode (E_EMI) 8013 indicates a mode of encoding of the payload portion, and it is used in calculation of a content key, together with the random number (Nc) 8015.

The exchange key label (Exchange_Key_Label) 8014 determines a label for identifying a key, which is exchanged in steps of the authentication processes 600 mentioned above.

The payload size (Byte Length of Payload) 8016 determines a payload size of the corresponding packet.

The payload portion 802 is constructed with encoding content.

FIG. 9 shows an example of the header portion of a content transmission packet 900 extended to be compatible with the extended copy control information.

The content transmission packet 900 extended to be compatible with the extended copy control information is constructed with a header portion 901 and a payload portion 902.

A payload type (P_T) 9017 is an identifier for indicating that the payload is the content or the extended copy control information; for example, "0" is set therein, when it is the content, while "1" therein, when it is the extended copy control information.

A reservation region (Reserved) 9012 is a region for reservation, and "000" is set thereto.

Portions other than the above are similar to those of the header portion of the conventional encoding content.

The payload-portion 902 is constructed with the encoding content or the extended copy control information, which is encoded.

The encoding mode (E_EMI) 8013 in case where the payload portion 902 is the extended copy control information may be same to what is set to the content, or may be a value different therefrom.

When using the present format, as the encoding method of the payload portion 902, the encoding may be made with using the exchange key, which is produced upon basis of the encoding mode (E_EMI) 8013 and the random number (Nc) 8015.

Also, for example, by hashing the extended copy control information and/or using an exclusive logical sum with the random number (Nc) 8015, which is included in the header portion of the content packet, etc., it is also possible to correlate between a value of the extended copy control information and the content key to encode the content, and thereby protecting the extended copy control information from falsification thereof, even if transmitting the extended copy control information without encoding thereof.

Figure 10:
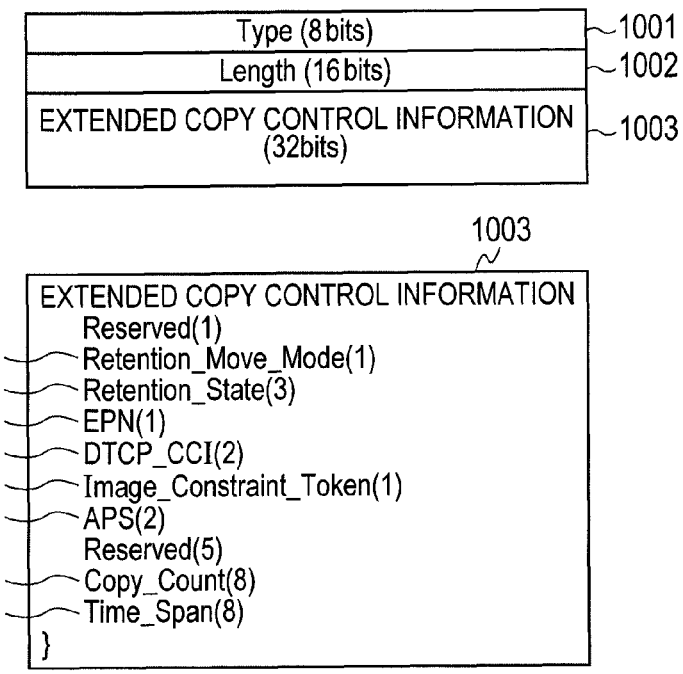
FIG. 10 is a view for showing an example of the structures of the extended copy control information.

FIG. 10 shows an example of the structures of the extended copy control information.

The extended copy control information is constructed with a Type 1001, a Length 1002 and extended copy control information 1003.

The Type 1001 is an ID for presenting a type of the extended copy control information, and it is used for discriminating the format of the extended copy control information of the corresponding packet.

The Length 1002 indicates a size of the extended copy control information, which is included in the corresponding packet.

The extended copy control information 1003 indicates the copy control information of the corresponding content, and is constructed with, for example, Retension_Move_Mode 10031, Retention_State 10032, EPN 10033, DTCP_CCI 10034, Image_Constraint_Token 10035, APS 10036, Copy_Count 10037 and Time_Span 10038.

The Retension_Move_Mode 10031 indicates permission/refusal of temporal storage.

The Retension_Move_Mode 10031 indicates a time of temporal storage.

The EPN 10033 indicates permission/refusal of managing without copy control with output protection.

The DTCP_CCI 10034 indicates the copy control information, which is defined in the DTCP method.

The Image_Constraint_Token 10035 indicates presence/absence of restriction of a video output signal.

The APS 100360 is analog output copy control information.

The Copy_Count 10037 indicates a number of times of copying.

The Time_Span 10038 indicates a viewing/listening time-period.

Within a packet for transmitting the extended copy control information, a first bit of data is treated as an identifier for discriminating the packet for use transmission of the extended copy control information and the packet for use of transmission of the content, and it may be in other format, for example, the header thereof is constructed with the Type 1001 and the Length 1002, as in the example of the structures shown in FIG. 10, and the payload portion thereof is constructed only with the extended copy control information, not similar to the format shown in FIG. 9, the format of the content transmission packet, but as far as it can be discriminated from the format of the content transmission packet shown in FIG. 8, for example, by setting that identifier to "1" in case of the extended copy control information, etc.

Transmitting the extended copy control information with such the format as was mentioned above, it is possible to transmit the copy control information, which is not defined in the present DTCP-IP method, for example, easily, not depending on the format of the content. Also, with the present format, it is possible to distinguish the packet to be the content or the extended copy control information, easily, and also addition or alternation of the copy control information can be done with ease.

Figure 13:
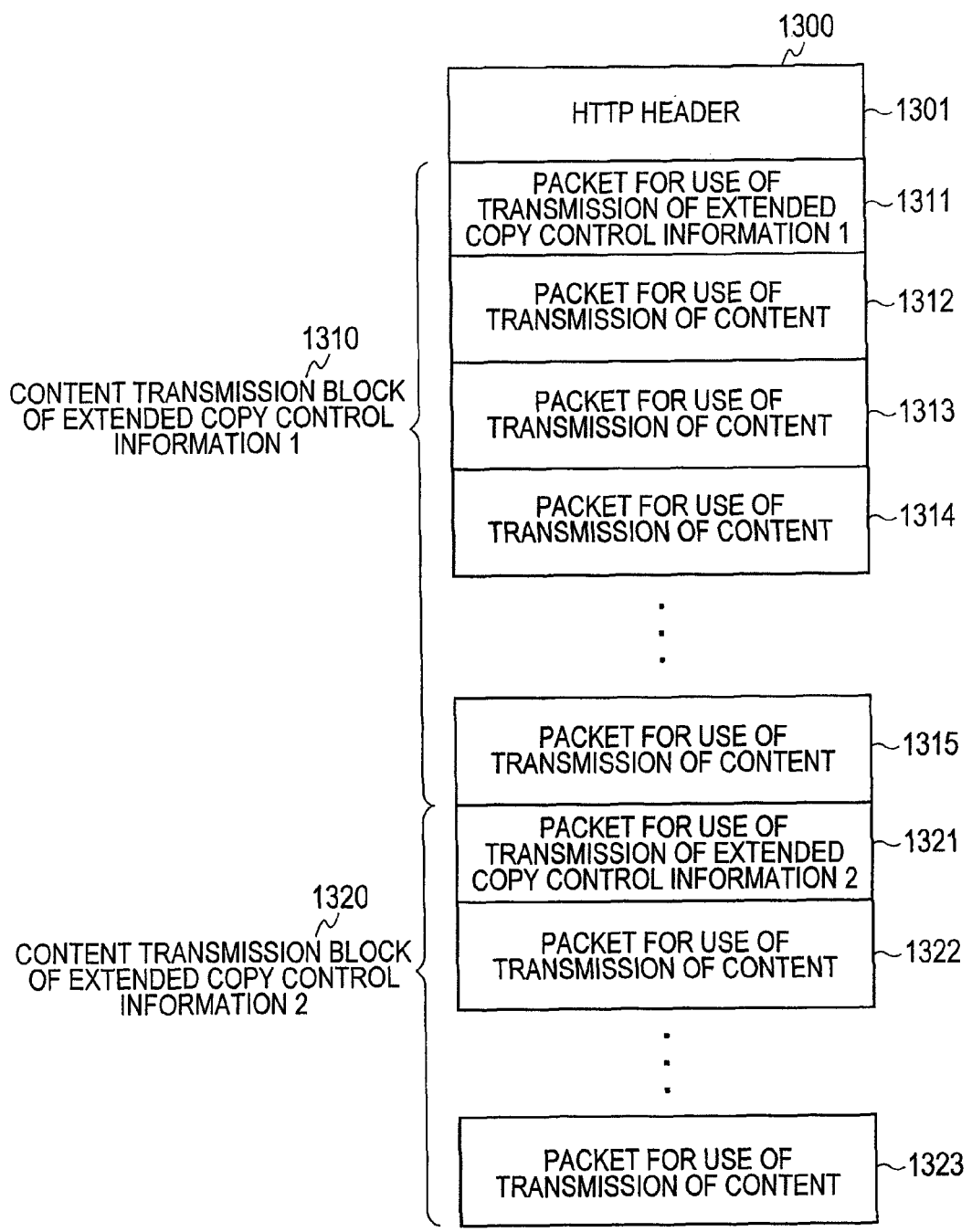
FIG. 13 is a view for showing an example of the structures of transmission data when transmitting the content for use of the extended copy control information, in particular, when the copy control information changes on the way of the content.

FIG. 13 shows an example of data, in case when transmitting the content utilizing the HTTP protocol therein, with using the format shown in FIG. 9. Herein, TCP is used as a transport layer protocol, but the TPC header is omitted.

Figure 19:
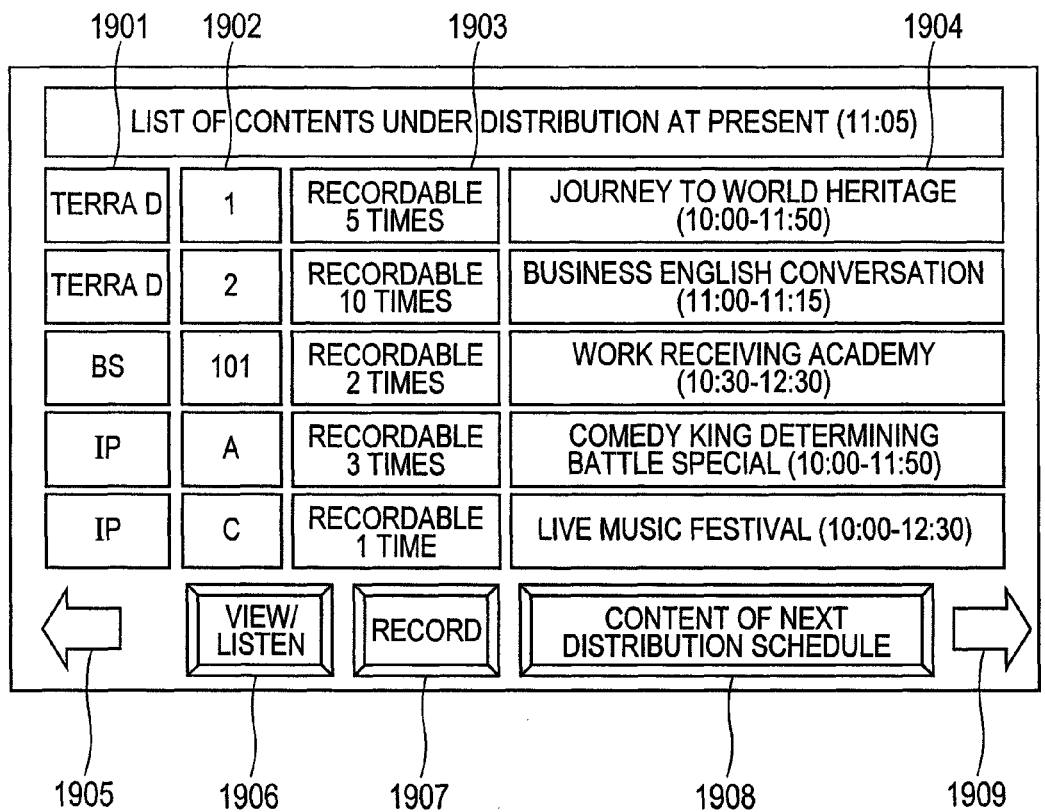
FIG. 19 is a view for showing an example of the structures of a display screen of a content list.

Transmission data 1100, when transmitting the content with using the format shown in FIGS. 9 and 19, is constructed with a HTTP header 1101, a packet 1110 for use of transmission of the extended copy control information, and a packet 1120 for use of transmission of the content.

The packet 1110 for use of transmission of the extended copy control information is constructed with a header portion 1111 for use of the extended copy control information and a payload portion (the extended copy control information) 1112.

The packet 1120 for use of transmission of the content is constructed with a header portion 1121 for use of the content and a payload portion (the content) 1122.

The header portion 1111 for use of the extended copy control information is the header portion, in which the payload type (PT) 9017 is set to "1" in the header portion of the content transmission packet shown in FIG. 9.

In the payload portion (the extended copy control information) 1112 are stored the exchange key, which is exchanged in the equipment identification process 700 for use of transmission of the extended copy control information shown in FIG. 7, and the extended copy control information, which is encoded upon basis of the information, such as, the encoding mode (E_EMI) 8013 set to the header portion 1111 for use of the extended copy control information and the random number (Nc) 8015, etc.

In the extended copy control information may be included, not only the example of the structures shown FIG. 10, but also information of plural numbers of formats, at the same time.

The packet 1110 for use of transmission of the extended copy control information is for indicating the copy control information of the contents thereafter, and is inserted into the transmission data, every time when at least the copy control information of the content is changed.

The header portion 1121 for use of the content is the header portion, in which the payload type (P_T) 9017 is set to "0" in the header portion of the content transmission packet shown in FIG. 9.

In the payload portion (the content) 1122 are stored the exchange key, which is exchanged in the equipment identification process 700 for use of transmission of the extended copy control information shown in FIG. 7, and the content, which is encoded upon basis of the information, such as, the encoding mode (E_EMI) 8013 set to the header portion 1121 for use of the content and the random number (Nc) 8015, etc.

Figure 11:
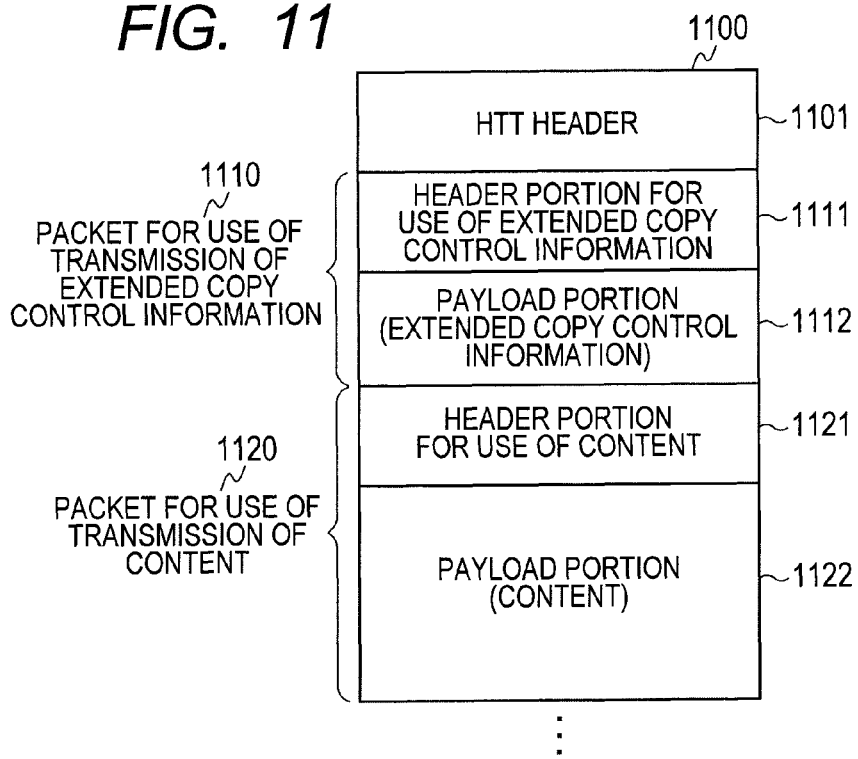
FIG. 11 is a view for showing an example of the structures of transmission data when transmitting the content of the extended copy control information.

Transmitting the extended copy control information and the content, by encoding them with the common exchange key(s), which is/are produced upon basis of the common exchange key, on the same TCP and HTTP session, in the format shown in FIG. 11, it is possible to protect the extended copy control information from falsification thereof, and also to combine the extended copy control information and the content, uniquely.

Also, even when transmitting the content with using the RTP protocol, for example, it is possible to transmit the content with the constructors similar to FIG. 11, by replacing the HTTP header 1101 by a RTP header. Or, if storing both the packet 1110 for use of transmission of the extended copy control information and the packet 1120 for use of transmission of the content for each RTP packet, it is possible to transmit the extended copy control information with certainty.

Figure 12:
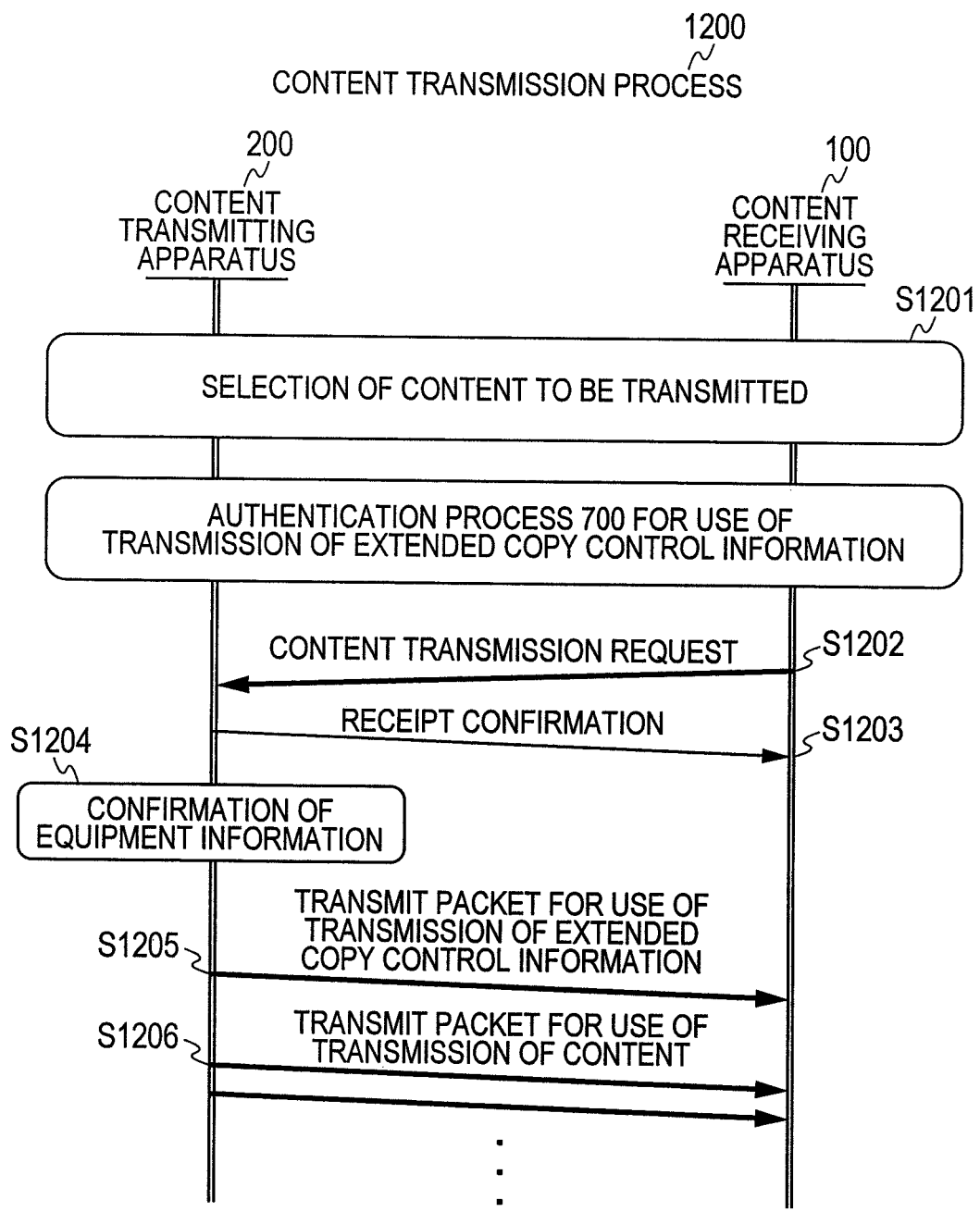
FIG. 12 is a view for showing an example of a sequence of processes for transmitting the content for use of the extended copy control information.

FIG. 12 shows an example of the steps when transmitting the content, including the number of times of copying and the viewing/listening time-period in the copy control information thereof, with using the extended copy control information.

First of all, determination is made on the content to be transmitted between the content transmitting apparatus 200 and the content receiving apparatus 100 (S1201). Herein, in the steps until content selection, there are provided a finding of the content transmitting apparatus 200 in the content receiving apparatus 100, presenting of the content by the content transmitting apparatus 200, and selection of the content within the content receiving apparatus 100, etc., for example, but for this may be applied a technology, such as, DLNA (Digital Living Network Alliance), etc.

Next, between the content transmitting apparatus 200 and the content receiving apparatus 100 is executed the equipment identification process 700 for use of transmission of the extended copy control information shown in FIG. 7. When the equipment identification process 700 for use of transmission of the extended copy control information is completed, then the controller unit 115 of the content receiving apparatus 100 issues a content transmission request to the content transmitting apparatus 200, with using a GET request of the HTTP, through the communication processor unit 113 (S1202).

The controller unit 215 of the content transmitting apparatus 200, when possible to transmit the content requested, transmits a confirmation of receipt indicating it is possible to transmit with using a response header of HTTP, etc., to the content receiving apparatus (S1203).

Next, after the equipment information management unit 209 of the content transmitting apparatus 200 confirms that the extended copy control information receipt permission/refusal of the content receiving apparatus 100 to be a target within the equipment information table 50 is set to "permission (Yes)" (S1204), the encoding/decoding processor unit 212 transmits the packet for use of transmission of the extended copy control information, which is constructed with the header portion indicating that the packet is for use of transmission of the extended copy control information, by setting the payload type 9017 shown in FIG. 9 to "1", and the payload including and the extended copy control information encoded, on the format shown in FIGS. 9, 10 and 11 (S1205).

Following to the above, with using the format shown in FIGS. 8 and 11 is transmitted the packet for use of transmission of the content, which is constructed with the payload including the header portion indicating that the packet is for use of transmission of the content by setting the payload type 9017 shown in FIG. 9 to "0", and the encoding content (S1206).

In case where the extended copy control information receipt permission/refusal of the content receiving apparatus is set to "rejection (No)", it is enough to transmit no content, or transmit the content with the connectional format.

Transmitting the content in accordance with the steps mentioned above, it is possible to transmit the content, including the extended copy control information therein, only to the equipment enabled to deal with the extended copy control information, regularly.

With the above-mentioned, when transmitting the content with using the wired or wireless LAN, it is possible transmit the copy control information, including the number of times of copying and the viewing/listening time-period, etc.

Embodiment 2

In the present embodiment 1 mentioned above, the copy control information is transmitted just before starting of the content. According to the present embodiment 2, when it changes on the way of the content, the copy control information can be transmitted with certainty, following to this.

FIG. 13 shows an example of transmission data when the copy control information changes on the way the content. Herein, the HTTP protocol is applied as the application layer protocol, and the TCP as the transport layer protocol; however the TCP header is omitted.

Transmission data 1300 is constructed with a HTTP header 1301, a content transmission block 1310 of the extended copy control information 1, and a content transmission block 1320 of the extended copy control information 2.

The content transmission block 1310 of the extended copy control information is constructed with a packet 1311 for use of transmission of the extended copy control information and packets 1312-1315 for use of transmission of the content. Herein, the copy control of the contents included within the packets 1312-1315 for use of transmission of the content is in accordance with the copy control information, which is transmitted by the packet 1311 for use of transmission of the extended copy control information.

The content transmission block 1320 of the extended copy control information is constructed with a packet 1321 for use of transmission of the extended copy control information and packets 1322-1325 for use of transmission of the content.

Herein, the copy control of the contents included within the packets 1322-1325 for use of transmission of the content is in accordance with the copy control information, which is transmitted by the packet 1321 for use of transmission of the extended copy control information.

In case where the copy control information changes in plural numbers of times within the content, hereinafter, it is enough to add a block, which is constructed with the packet for use of transmission of the extended copy control information, for transmitting the corresponding copy control information every time when the copy control signal changes, and the packet for use of transmission of the content, for transmitting a part(s) of the content following to the corresponding copy control information.

Figure 14:
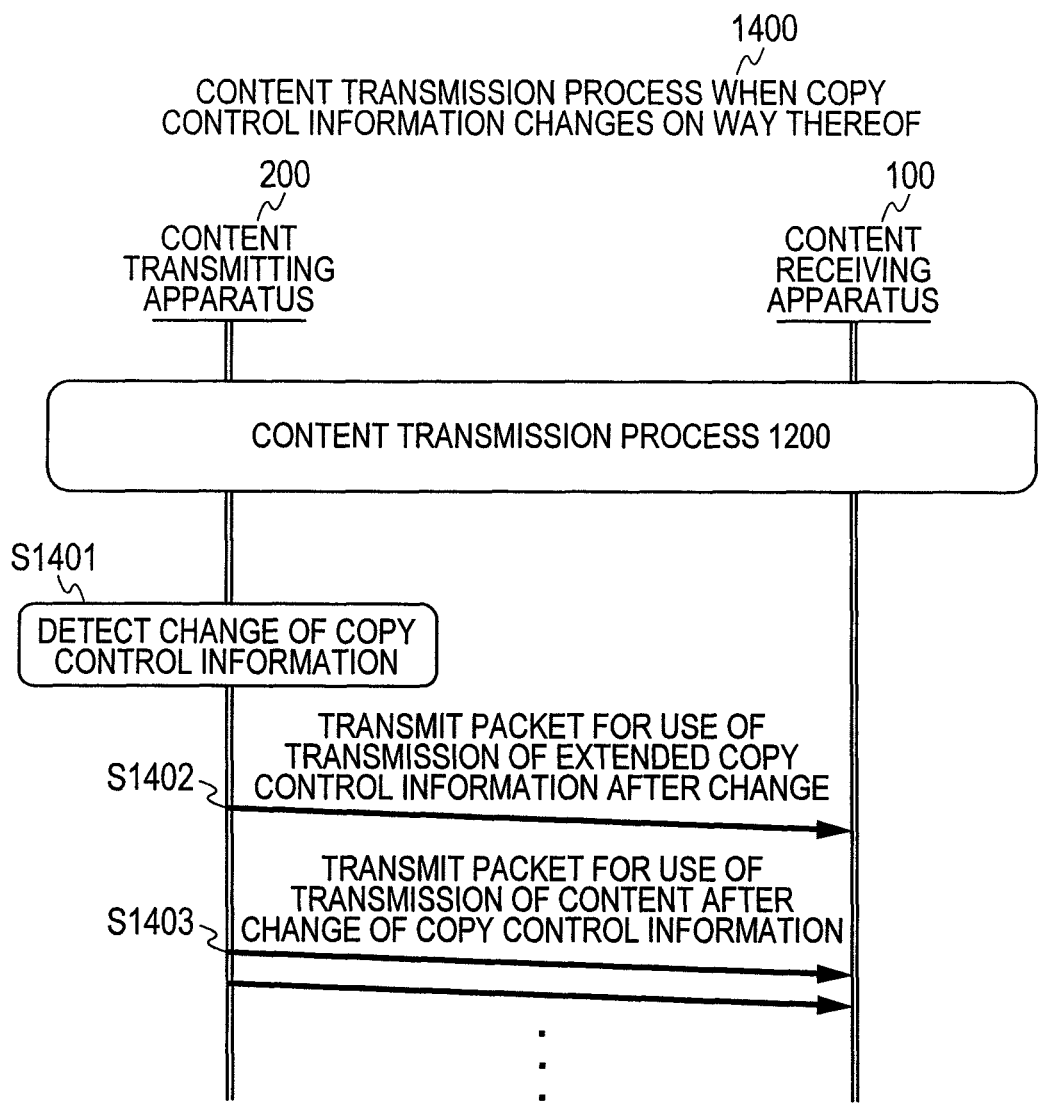
FIG. 14 is a view for showing an example of a sequence of processes for transmitting the content for use of the extended copy control information, in particular, when the copy control information changes on the way of the content.

FIG. 14 shows an example of the steps of transmission, in particular, when the copy control information changes on the way of the content, in case of transmitting the content including the number of times of copying and the viewing/listening time-period in the copy control information thereof, with using the extended copy control information therein.

Steps from the selection of the content to be transmitted up to starting of transmission of a first copy control information block of the content are similar to those of an ordinary content transmission process 1200 shown in FIG. 12. In the content transmitting apparatus 200, when the controller unit 215 detects change of the copy control information of the content, which the controller unit 215 transmits (S1401), the encoding/decoding processor unit 212 transmits the packet for use of transmission of the extended copy control information, which is constructed with the header portion indicating that the corresponding packet is for use of transmission of the extended copy control information, by setting the payload type 9017 shown in FIG. 9, and the payload including the encoded copy control information after changing thereof, on the format shown in FIGS. 9, 10 and 11 (S1402).

Following to the above, it transmits the packet for use of transmission of the content, which is constructed with the header portion indicating that the corresponding packet is for use of transmission of the content, by setting the payload type 9017 shown in FIG. 9, and the payload including the encoded content following to the copy control information after changing thereof, on the format shown in FIGS. 9 and 11 (S1403). In case where the copy control information changes in plural numbers of times within the content, hereinafter, the steps from S1401 to S1403 are repeated every time when the copy control signal changes.

Transmitting the content by the steps shown in FIG. 14, with using such format of transmission data as shown in FIG. 13, it is possible to transmit the copy control information thereof, with certainty, even when the copy control information changes on the way of the content, and thereby enabling the copy control fitting to the change of the copy control information.

With the above-mentioned, when transmitting the content with using the wired or wireless LAN, it is possible transmit the copy control information, including the number of times of copying and the viewing/listening time-period, etc., even in the case when the copy control information changes on the way of the content.

Embodiment 3

In the present embodiment, with using the copy control information, including the number of times of copying and the viewing/listening time-period, and the content transmitting method, which are described in the embodiments 1 and 2, description will be made on a method for transmitting the content attached with the number of times of copying, in particular.

Figure 15:
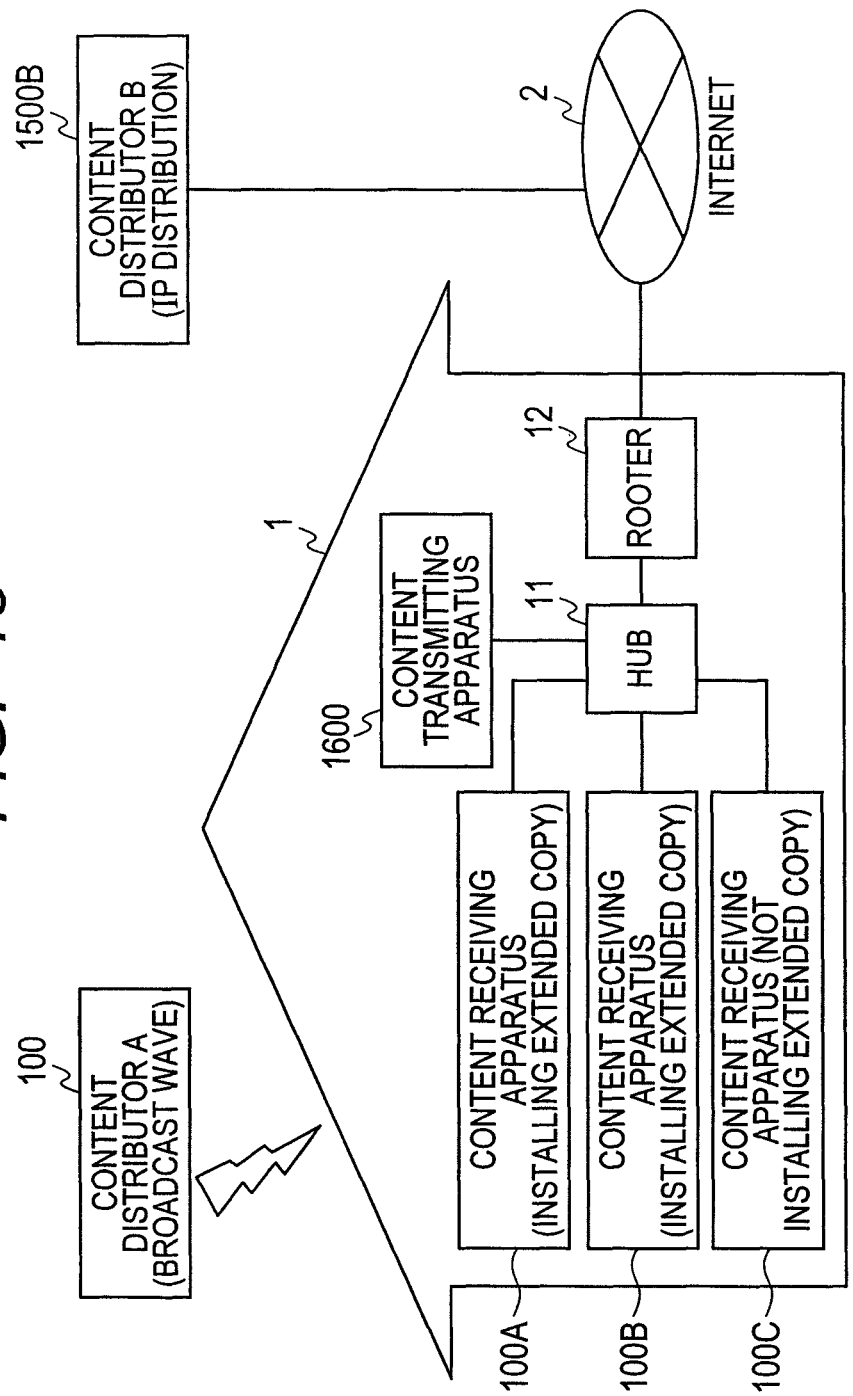
FIG. 15 is a graphic view for showing an example of the structures of a system.

FIG. 15 shows an example of the system structures or configuration, which will be explained in the present embodiment.

In the user's house, a content transmitting apparatus 1600, content receiving apparatuses 100A/100B, which can deal with the extended copy control information, and a content receiving apparatus 100C, which is not compartible with the extended copy control information (for example, the conventional apparatus or the apparatus having no necessity of dealing with the extended copy control information) are connected with the network hub device 11, respectively, through cables of the wired LAN, and the network hub device 11 is connected to the rooter 12.

The content transmitting apparatus 1600 receives the content, arbitrarily, from a content distributor apparatus "A", a broadcasting station distributing the content on a broadcast wave or airwave, such as, a terrestrial digital broadcasting, a satellite digital broadcasting, etc., from a content distributor apparatus "B", such as, acTVila or Internet TV, etc., distributing the content through Internet 2, and bring it/them to be transmittable to the content receiving apparatuses 100A to 100C. However, the content distributor apparatus may be a cable businessman providing services, such as, a broadcast program, Internet connection, a telephone, etc., with using an exclusive line (a coaxial cable or an optical cable, etc.)

Other structures are Similar to those explained by referring to FIG. 1.

Herein, in the system mentioned above, the wired LAN is used as a connection between the apparatuses; however it may be any kind of a communication medium, as far as it is applicable thereon the content protection, such as, wireless LAN, USB (Universal Serial Bus), IEEE 1394, Bluetooth, etc.

Also, in the present embodiment, description will be made on the case where the DTCP method is applied as the content protection method; however, in the place thereof, there may be applied other content protection, such as, Marlin, HDCP High-bandwidth Digital Content Protection System), WMDRM (Windows® Media DRM for Network Devices), or FMRMS (Adobe Flash Media Rights Management), etc.

FIG. 16 shows an example of the structures of the content transmitting apparatus 1600 to be applied in the present embodiment.

The content transmitting apparatus 1600 is built up with a tuner 201, a descrambler 202, a de-multiplexer 203, a decoder 204, a display/speaker 205, an input processor unit 207, an equipment authentication processor unit 208, an equipment information management unit 209, an encoding/decoding processor unit 212, a communication processor unit 213, digital input/output terminals 214, a controller unit 215, a copy control information analyzer unit 1601, digital video/audio output terminals 1602, analog output terminals 1603, a digital video/audio input terminals 1604 and analog input terminals 1605.

The copy control information analyzer unit 1601 analyzes the copy control information attached with the content, which is received from the content distributor apparatus "A" 1500A or the content distributor apparatus "B", to determine the copy control information to be added when transmitting the content to the content receiving apparatuses 100A to 100C, and notices the copy control information to the controller unit 215.

The digital video/audio output terminals 1602 are terminals for outputting outside an audio signal and a video signal, which are outputted from the decoder and are already decoded, on a non-compression digital data format. There are HDMI, DVI (Digital Visual Interface), or digital audio IF (InterFace), etc.

The analog output terminals 1603 are terminals for outputting outside the audio signal and the video signal, which are outputted from the decoder 204 and are decoded, on an analog format.

The digital video/audio input terminals 1604 are terminals for inputting the audio signal and the video signal of the digital data format, from an outside. There are HDMI, DVI or digital audio IF, etc.

The analog input terminals 1605 are terminals for inputting the audio signal and the video signal of the analog format from an outside.

Other portion(s) than that from the tuner 201 up to the controller unit 215 are similar to those of the content transmitting apparatus 200, which was explained by referring to FIG. 3. Also, similar to the content transmitting apparatus 200, there may be provided the recording/reproducing processor unit 210 and the HDD 211 in the structures thereof. Also, the display unit 205 may be attached, externally. The tuner 201 can be provided, not only one (1) set, but in plural numbers thereof.

In the present embodiment, it is assumed that the content provided from the content provider "A" 1500A is received on the tuner 201, and that the content provided from the provider "B" 1500A is received on the digital input/output terminals 214.

The structures of the content receiving apparatuses 100A to 1000 may be similar to those of the content receiving apparatus 100, which was explained by referring to FIG. 2. Also, similar to the content transmitting apparatus 1600, there may be provided the copy control information analyzer unit, the digital video/audio input terminals, the digital video/audio output terminals, the analog input terminals and the analog output terminals, in the structures thereof.

FIG. 17 shows an example of the structure of content protection information 1700, which is attached to the content by the content providers 1500A and 1500B.

The content protection information 1700 is constructed with a copy control method 1701, digital copy control information 1702, an analog video output control 1703, a high-speed digital IF output protection 1704, a number-limited copy 1705 and a piece number 1706.

The copy control method 1701 indicates the information of the format for controlling a copy generation. For example, "01" means that the DTCP protection is executed, and "11" means that the DTCP protection is not executed, respectively.

The digital copy control information 1702 presents the information for controlling the copy generation. For example, "00" means that copy can be made without restricting condition, "10" means that copy can be made only one (1) generation, "01" means that copy cannot be made again, and "11" means that copy is inhibited, respectively.

The analog video output control 1703 indicates the information for controlling the copy when outputting an analog output.

The high-speed digital IF output protection 1704 indicates on whether the content protection should be executed or not upon the output of the digital interface, when the digital copy control information 1702 is "00 (copy can be made without restricting condition)".

The number-limited copy 1705 indicates the information for controlling the management of the content of a target of the number-limited copy. For example, "0" means not applying "number-limited copy permission", "1" means applying "number-limited copy permission", respectively.

The number-limited copy means a copy that can be made within a range of a limited number of pieces. For example, when recording the content onto the HDD, the number-limited copy of which can be made to 10 pieces, then that content can be copied onto other recoding media by remaining number of times, 9 times. Thus, that content can exist up to 10 pieces at the maximum.

Also, the content of target of the number-limited copy (or, "number-limited copy target content") is the content, which can be copied within the range of the limited number of pieces.

The piece number 1706 indicates the number of times with which recoding can be made, when the number-limited copy 1705 is in the condition of "1 (applying the number-limited copy permission)". When this value is "0", the value of the copy inhibition or the number-limited copy 1705 can be treated to be invalid. Also, when this value is "1" or more than that, as the copy control information of the analog video output control 1703, information of copy inhibition may be inserted into the analog signal with using CGMS-A, etc.

In the present embodiment, explanation will be given, with an assumption that the content protection information 1700, which is added to the number-limited copy target content by the content provider A/B, has the following elements:
  the copy control method 1701=01 (execute DTCP protection)
  the digital copy control information 1702=10 (copy can be made only one (1) generation) the number-limited copy 1705=1 (applying the number-limited copy permission)
  the piece number=1 or more than that The content transmitting apparatus 1600, receiving the number-limited copy target content attached with the content protection information 1700 having such contents as mentioned above, can transmit the content, in particular, to the content receiving apparatus 100C, which is not compatible with the extended copy control information 1003, with "copy can be made only one (1) generation" (i.e., treating the number-limited copy target content as the content of "copy can be made only one (1) generation". Also, to the content receiving apparatuses 100A/100B, which are compatible with the extended copy control information 1003, it can transmit it under the condition of "copy can be made only one (1) generation" or "number-limited copy can be made (with the number of times of copying)".

Next, by referring to FIGS. 18 to 22, explanation will be given on a method for the content receiving apparatus 100A to obtain the content information from the content transmitting apparatus 1600, and thereby issuing a transmit request of the number-limited copy target content, and also to obtain that content.

FIG. 18 shows the steps from when the content receiving apparatus 100A obtain the content information for the content transmitting apparatus 1600, until when it selects the content.

As is shown in FIG. 12, with applying the technology therein, such as, DLNA, etc., the content receiving apparatus 100A finds the content transmitting apparatus 1600 existing on the network, upon change of an event, such as, an instruction of the user, reservation of viewing/listening or recording, etc., and issues an obtain request of the content information to the content transmitting apparatus 1600 (S1801).

Responding to this, the content transmitting apparatus 1600 obtains the information relating to the contents, which can be received presently, from the content distributor apparatus "A" 1500A and/or the content distributor apparatus "B" 1500B through the tuner 201 and/or the digital input/output terminals 214, and delivers it to the copy control information analyzer unit 1601 (S1802). The copy control information analyzer unit 1601 confirms the contents of the copy control information 1700 attached to the content, each (S1803).

And, if there is the number-limited copy target content within the receivable contents (S1804), it build in specific information indicating "number-limited copy can be made (with the number of times of copying)" (for example, CC_FLAG=TRUE, CC_COUNT=X), into the information relating to the number-limited copy target content, such as, the header portion and/or the body portion of HTTP (S1805).

And, it transmits each of the content information to the content receiving apparatus 100A (S1806).

The content receiving apparatus 100A receiving the content information, in particular, when letting the user to select the content, displays a content list screen 1900, as shown in FIG. 19, on the display unit/speaker 105 (S1807). Then, the user selects the content, arbitrarily, on the content list screen 1900, and further select to view/listen or record that content (S1808).

FIG. 19 shows an example of the structure of the content list screen.

On the content list screen 1900 is displayed the information relating to the contents, which are distributable at present, for example, distributor information 1901 showing the content distributor apparatuses, such as, the terrestrial digital broadcasting, a BS digital broadcasting, a CS digital broadcasting, the Internet TV, etc., or indicating kinds of the receiving parts, such as, the tuner 201 or the input/output terminals 214, etc., service information 1902 showing channel numbers or service ID, copy control information 1903 indicating the permission/refusal of recording and the number of times thereof, and a content name 1904.

Other than those may be included information, such as, contract information, a summary, an output condition, a kind of video.

Also, as operating buttons may be displayed scroll buttons 1905/1909 of the screen of content list, a [view/listen] button 1906 for the user to indicate the viewing/listening, a [record] button 1907 for giving an instruction of recording, and a [content to be distributed next] button 1908 for showing a list of contents, which will be distributed next to the content displayed.

Figure 20:
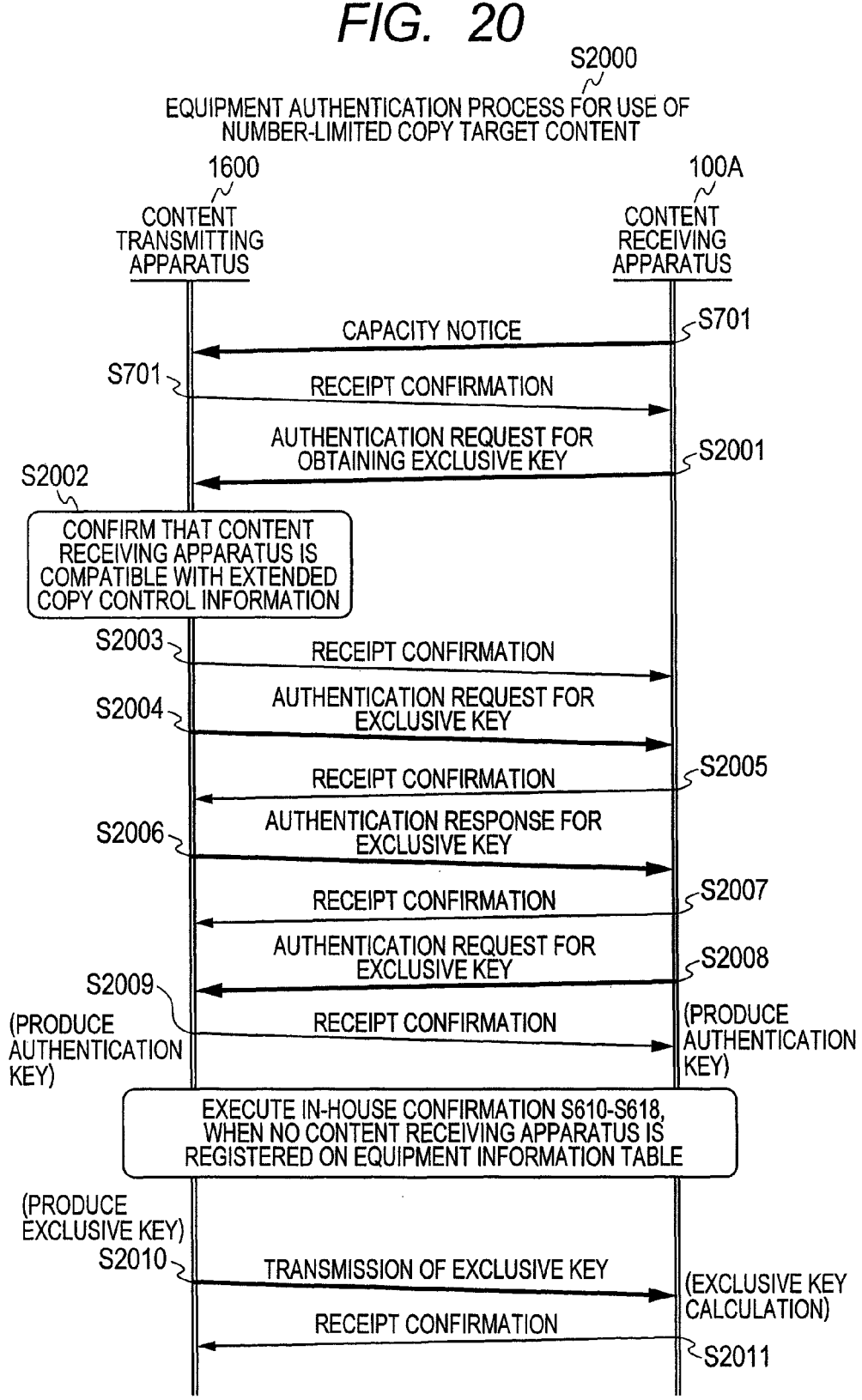
FIG. 20 is a view for showing an example of a sequence of processes for authenticating equipment for use of extended copy control information for exclusive use of a key, which is executed between the content receiving apparatus and the content transmitting apparatus.

FIG. 20 shows an example of steps of an equipment authentication process 2000 to be executed when distributing the number-limited copy target content between the content receiving apparatus 100A and the content transmitting apparatus 1600.

First of all, as was explained by referring to FIG. 7, the content receiving apparatus 100A transmits the capacity notice indicating that the apparatus itself is able to receive the extended copy control information, to the content transmitting apparatus 1600 (S701), and responding to that, the content transmitting apparatus 1600 also transmits a confirmation of receipt indicating that the apparatus itself is able to transmit the extended copy control information therefrom, to the content receiving apparatus 100A (S702).

Next, the content receiving apparatus 100A transmits a request of authentication (hereinafter, "authentication request") including information of requiring an exclusive key necessary for receiving the number-limited copy target content (i.e., a value differing from the exchange key, which is shared, in common, in FIG. 7), to the content transmitting apparatus 1600 (S2001).

The content transmitting apparatus 1600 receiving the authentication request confirms that the content receiving apparatus 100A is capable with the extended copy control information 1003 (S2002), and returns a confirmation of receipt thereof (S2003).

In the steps S2004 to S2009 thereafter, the steps S603 to S608 of the equipment authentication process explained by referring to FIG. 7 are executed. In that instance, similar to S2001, the information requiring the exclusive key ma by included in all or a part of the transmission data.

Thereafter, the content transmitting apparatus 1600 determines on whether the information relating to the content receiving apparatus 100A is registered or not in the equipment information table 510 within the apparatus itself, and if not registered therein, it executes the steps S610 to S618 of the equipment authentication process explained by referring to FIG. 6. And, it executes the renewal process S703 of the equipment information table 510, which was explained by referring to FIG. 7.

Finally, the content transmitting apparatus 1600 encodes the produced exclusive key with using the authentication key, and transmits it to the content receiving apparatus 100A, together with an ID for discriminating the exclusive key (S2010). The content receiving apparatus 100A decodes the exclusive key with using the authentication key, and it also transmits a confirmation of receipt to the content transmitting apparatus 1600 (S2011).

Executing the steps mentioned above, between the apparatuses, it is possible to share the key(s), commonly, to be used for encoding/decoding the content, while confirming them to be the regularly authorized equipment with each other, as well as, compatible with transmission of the extended copy control information or not, and further, safely, with distinguishing the number-limited copy target content from other contents.

Herein, the exclusive key may be destroyed after completion of transmission of the number-limited copy target content, and thereby executing the equipment authentication process 2000 for each of the contents. Also, it may be destroyed after passing a predetermined time-period from when stopping transmission of the content of the apparatus itself. Further, an indication of destroying the exclusive key may be transmitted from the content transmitting apparatus to the content receiving apparatus (or, in contrary thereof)

Figure 21:
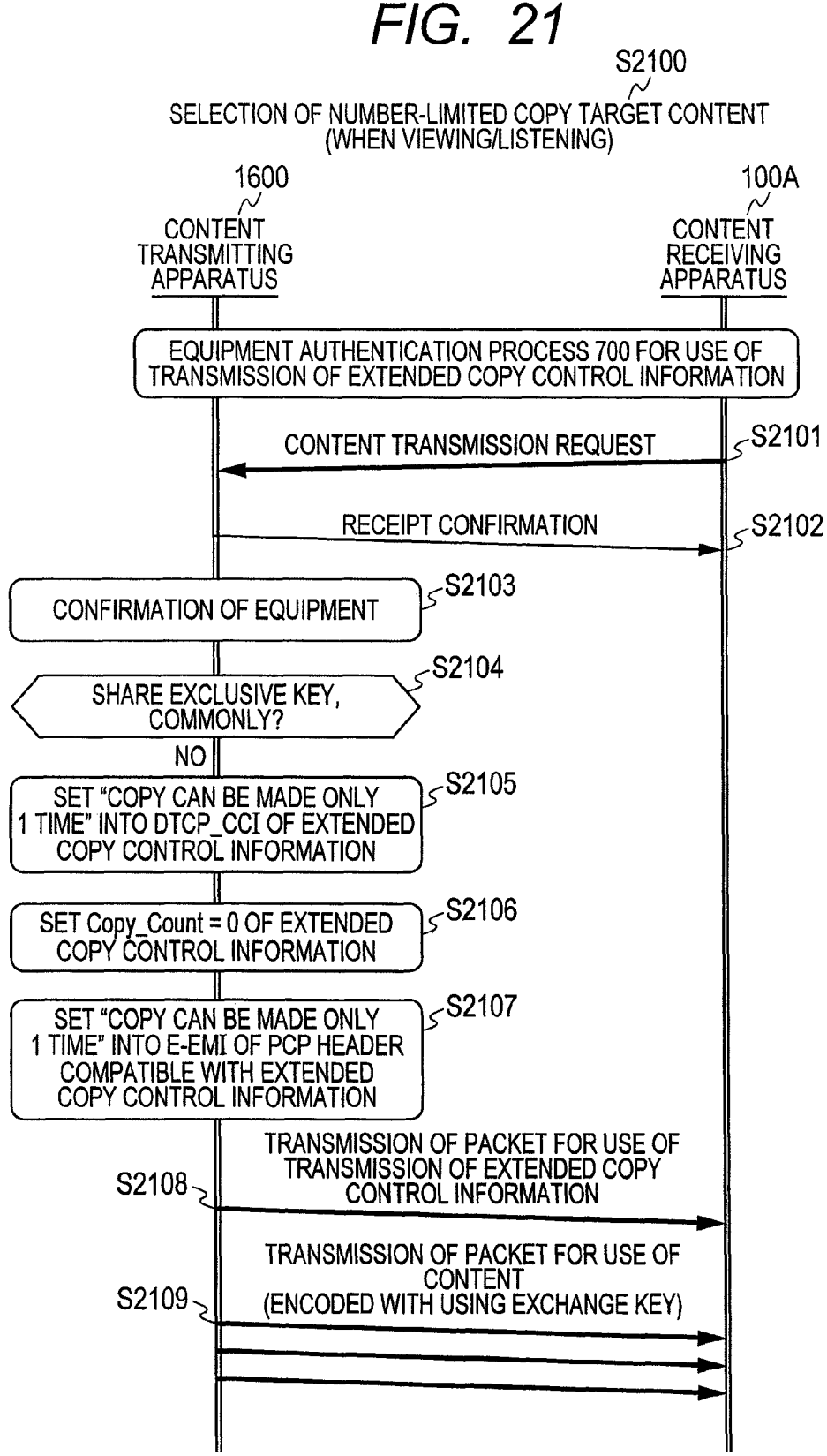
FIG. 21 is a view for showing an example of a sequence of processes for transmitting the content for use of the extended copy control information, for transmitting number-limited copy target content upon "only 1 generation copy"

FIG. 21 shows an example of steps of a content transmission process 2100 for the content receiving apparatus 100A obtain content from the content transmitting apparatus 1600, in case where the user selects the number-limited copy target content on the display screen of the content list shown in FIG. 19 and pushes down the [view/listen] button 1906, in S1808 of FIG. 18.

First of all, between the content transmitting apparatus 1600 and the content receiving apparatus 100A is executed the equipment authentication process 700 for use of transmission of the extended copy control information explained by referring to FIG. 7. When the equipment authentication process 700 for use of transmission of the extended copy control information is completed, the controller unit 115 of the content receiving apparatus 100A issues a content transmission request to the content transmitting apparatus 1600, with using the GET request of HTTP, etc., through the communication processor unit 113 (S2101).

The controller unit 215 of the content transmitting apparatus 1600, when the requested number-limited copy target content is transmittable, transmits the confirmation of receipt indicating it to be transmittable with using a response header of HTTP, etc., to the content transmitting apparatus 100A (S2102).

Next, after the equipment information management unit 209 of the content transmitting apparatus 1600 confirms that the extended copy control receipt permission/refusal of the content receiving apparatus 100A, to be a target within the equipment information table 50, is set to "permission (Yes)" (S2103), then the copy control information analyzer unit 1601 determined on whether "the exclusive key, which can be shared, commonly, in the equipment authentication process 2000 for use of the number-limited copy target content" is shared with, commonly, between the content receiving apparatus 100A (S2104).

Herein, since the equipment authentication process 700 was executed, a result of determination is that the exclusive key is not shared with. This means that the number-limited copy target content is transmitted as "copy can be made only one (1) generation".

Herein, in FIG. 31 is shown a relationship between the content protection information 1700 relating to the content distributed by the content distributer 1500A or 1500B, and the extended copy control information 1003 to be transmitted with it, when the content transmitting apparatus 1600, receiving the content thereon, transmits that content the other content receiving apparatus 100A/100B.

However, though not described in FIG. 31, into APS 10036 is set a value of the analog video output control 1703, and into Copy_Count 10037 is set a value of the piece number 1706, respectively.

Also, it is assumed that, into Retention_Move_Mode 10031, Retention_State 10032 and Image_Constraint_Token 10035 are set the value, which is already defined by the content distributor apparatus 1500A or 1500B, or a value referring to the content protection information 1700 having the items mentioned above.

Further, although explanation was made that as "copy can be made within limited-number" to be set into E-EMI 9013 is "0011: Copy Count"; however, it may be, for example, "0110: Move", but other than the values, "0000: No encoding", "0010: Copy free with EPN", "0100: No more copies", "1000/1010: Copy one generation" and "1100: Copy never".

The copy control information analyzer unit 1601 of the content transmitting apparatus 1600, by referring to the content protection information 1700, which is provided by the content distributor apparatus 1500A or 1500B, sets a value of the digital copy control information 1702, "1000: copy can be made only one (1) generation", into DTCP_CCI 10034 of the extended copy control information 1003 (S2105), and sets "0" into "Copy_Count" 10037 (S2106).

And then, after setting "1000: copy can be made only one (1) generation" into the E-EMI 8013 of a PCP header compatible with the extended copy control information (S2107), the encoding/decoding processor unit 212 transmits the packet for use of transmission of the extended copy control information, which is constructed with the deader portion indicating that the packet is for use of transmission of the extended copy control information, by setting the payload type 9017 shown in FIG. 9 to "1", and the encoded payload including the extended copy control information therein, on the format shown in FIGS. 9, 10 and 11 (S2108).

Following to the above, it transmits the packet for use of transmission of the content, which is constructed with the header indicating that the packet is for use of transmission of the content, by setting the payload type 9017 shown in FIG. 9 to "0", and the payload including the content encoded by the common key calculated with using the exchange key, on the format shown in FIGS. 9 and 11 (S2109).

Herein, the steps from S2105 to S2107 can be changed. Also, S2106 may be omitted therefrom. Further, the confirmation of receipt may be retuned, after the processing of S2103, S2104 and S2107.

With the steps mentioned above, in case of the number-limited copy target content, even if the content receiving apparatus 100A is able to receive the extended copy control information, the content transmitting apparatus 1600 transmits the number-limited copy target content, as "copy can be made only one (1) generation", when no exclusive key is shared with, commonly, between the content transmitting apparatus 1600. Herein, regarding other information, such as, the analog video output control 1703 other than S2105, S2106 and S2107, and the high-speed digital IF output protection 1704, etc., it is assumed that they are determined in accordance with the steps, which are defined by the content distributor apparatus 1500A/1500B.

Figure 22:
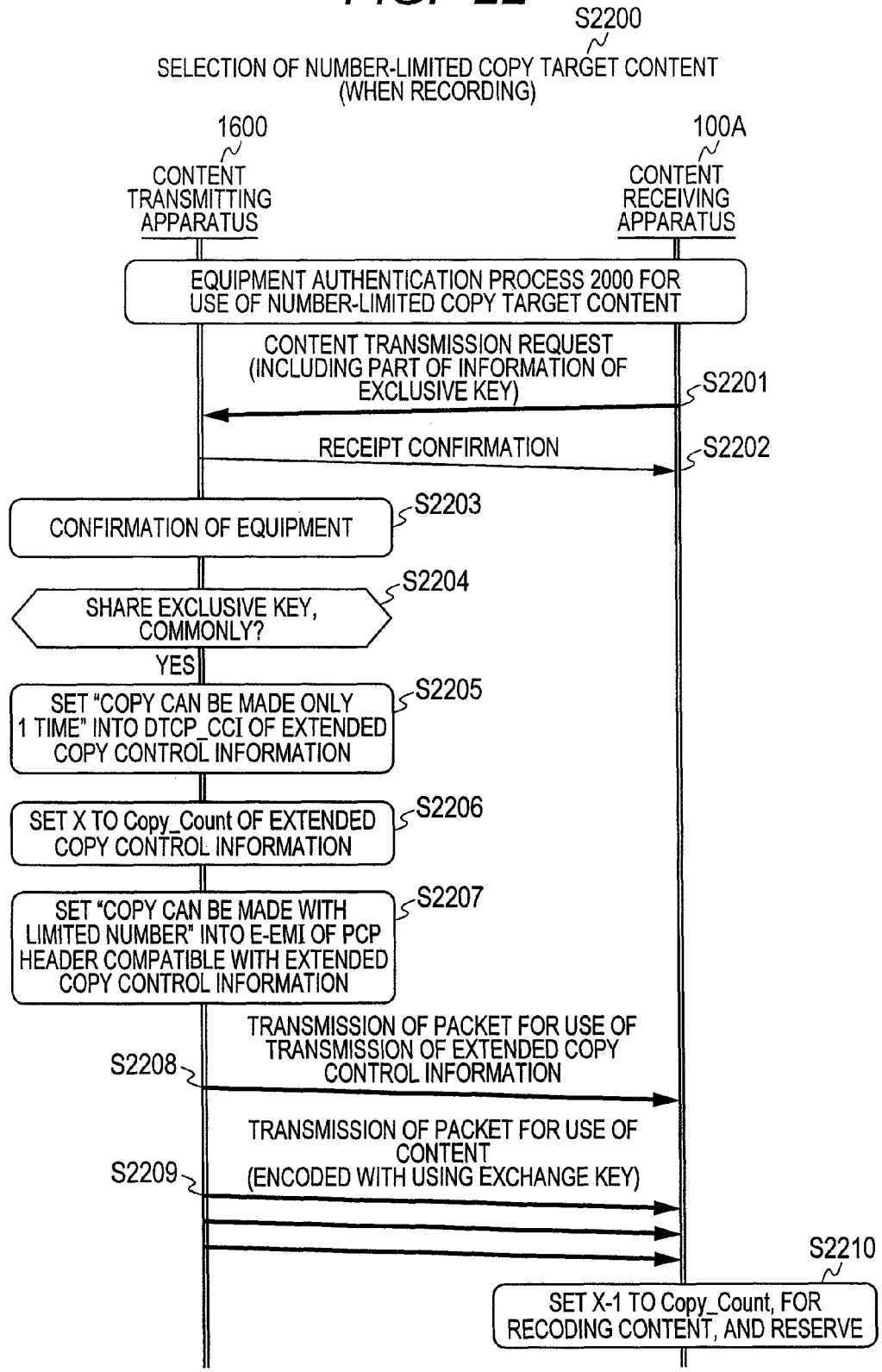
FIG. 22 is a view for showing an example of a sequence of processes for transmitting the content for use of the extended copy control information, for transmitting number-limited copy target content upon "copy of limited-number"

Next, FIG. 22 shows an example of steps of content transmission process 2200 for the content receiving apparatus 100A to obtain the content from the content transmitting apparatus 1600, when the user pushes down the [record] button 1907 by selecting the number-limited copy target content on the display screen of the content list shown in FIG. 19, in S1808 of FIG. 18.

First of all, between the content transmitting apparatus 1600 and the content receiving apparatus 100A is executed the equipment authentication process 2000 for use of transmission of the extended copy control information, for the purpose of transmission of the number-limited copy target content.

When the equipment authentication process 2000 is completed, the controller unit 115 of the content transmitting apparatus 100A installs a part of the information of the exclusive key, which is commonly shared in the equipment authentication process 2000 (for example, Exchange_key_label of the exclusive key or a several number of bites of the exclusive key), into the GET request, etc., of HTTP, and it issues a request of content transmission to the content transmitting apparatus 1600 (S2201).

The controller unit 215 of the content transmitting apparatus 1600, if the number-limited copy target content requested is transmissible, transmits the confirmation of receipt thereof indicating that the transmission is possible, with using the response header, etc., of HTTP, to the content transmitting apparatus 100A (S2202).

Next, after the equipment information management unit 209 of the content transmitting apparatus 1600 confirms that the extended copy control receipt permission/refusal of the content receiving apparatus 100A, to be a target within the equipment information table 50, is set to "permission (Yes)" (S2203), then the copy control information analyzer unit 1601 determined on whether "the exclusive key, which can be shared with, commonly, in the equipment authentication process 2000 attached with the number of times of copying" is shared or not, commonly, between the content receiving apparatus 100A (S2204).

Herein, since the equipment authentication process 2000 was executed, a result of determination comes to that the exclusive key is shared with. This means that the number-limited copy target content is transmitted as "copy can be made with limited number".

The copy control information analyzer unit 1601 of the content transmitting apparatus 1600, by referring to the content protection information 1700, which is provided by the content distributor apparatus 1500A or 1500B, sets a value of the digital copy control information 1702, "10: copy can be made only one (1) generation", into DTCP_CCI 10034 of the extended copy control information 1003 (S2205), and sets a value of the piece number 1706 into "Copy_Count" 10037 (S2206).

And then, after setting "0011: copy can be made with limited number" into the E-EMI 8013 of a PCP header enabled to deal with the extended copy control information (S2207), the encoding/decoding processor unit 212 transmits the packet for use of transmission of the extended copy control information, which is constructed with the deader portion indicating that the packet is for use of transmission of the extended copy control information, by setting the payload type 9017 shown in FIG. 9 to "1", and the encoded payload including the extended copy control information therein, on the format shown in FIGS. 9, 10 and 11 (S2208).

Following to the above, it transmits the packet for use of transmission of the content, which is constructed with the header indicating that the packet is for use of transmission of the content, by setting the payload type 9017 shown in FIG. 9 to "0", and the payload including the content encoded by the common key calculated with using the exchange key, on the format shown in FIGS. 9 and 11 (S2209).

The encoding/decoding processor unit 112 of the content receiving apparatus 100A decodes the content received, by the common key calculated with using the exclusive key, which is shared with, commonly, in the equipment authentication process 2000, and depending on necessity thereof, it is encoded, again, to be recorded on the HDD 111.

In that instance, Copy_Count is decremented by "−1" for the recorded content, and it is reserved (S2210).

With the steps mentioned above, when the exclusive key is shared with, commonly, between the content receiving apparatus 100A and the content transmitting apparatus 1600, the content transmitting apparatus 1600 can transmit the number-limited copy target content, as "copy can be made with limited number".

Further, about other information, such as, the analog video output control 1703 other than S2205, S2206 and S2207, and the high-speed digital IF output protection 1704, etc., it is assumed that they are determined in accordance with the steps, which are defined by the content distributor apparatus 1500A/1500B.

Herein, "0011: copy can be made with limited number" is set into the E-EMI 8013 of the PCP header compatible with the extended copy control information, in S2207; however it may be any value other than "0000: Copy free (without code)"/"0010: Copy free with EPN (encoding target copy free)"/"1000/1010: Copy one generation (copy can be made only one (1) generation)"/"1100: Copy never (copy inhibited)"/"0100: No more copies (copy cannot be made again)".

Also, the confirmation of receipt in S2202 may be returned after the processing in S2203, S2204 and S2207. Further, the steps from S2205 to S2207 may be changed.

Next, explanation will be made on an example of a method, with which the content transmitting apparatus 1600 uploads the number-limited copy target content for the content receiving apparatus 100A.

Figure 23:
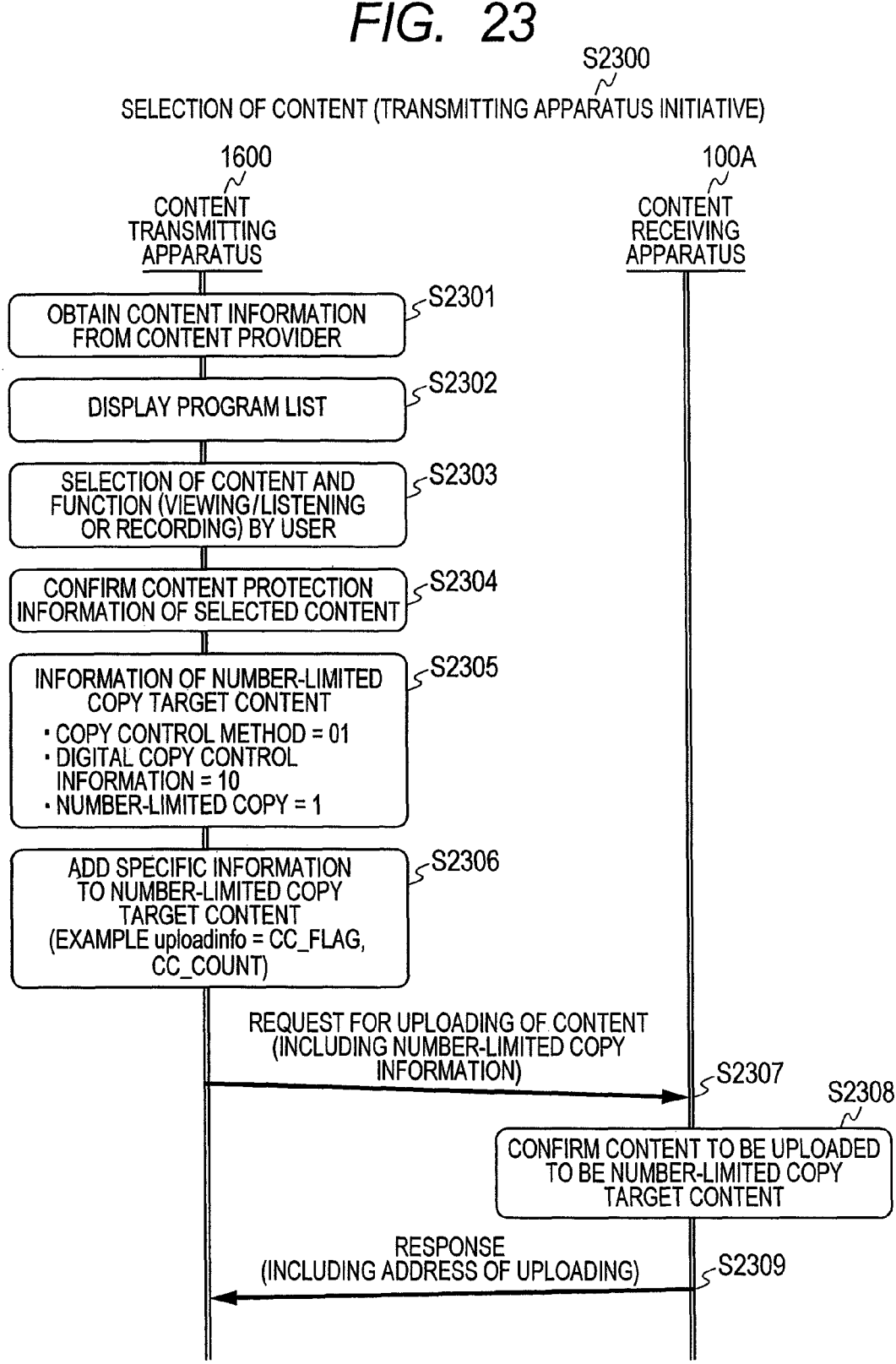
FIG. 23 is a view for showing an example of a sequence for informing that the content transmitting apparatus uploads the number-limited copy target content onto the content receiving apparatus.

FIG. 23 shows the steps up to when the content transmitting apparatus 1600 selects the content to be transmitted and notices that it will be transmitted, to the content receiving apparatus 100A.

The content transmitting apparatus 1600 obtains EPG (Electronic Program Guide) from the content provider 1500A/1500B (S2301), and displays a program list on the display unit/speaker 205 (S2302).

The user selects arbitrary content on the program list, and further selects whether to be viewed/listened or recorded on other apparatus (upload) (S2303).

In case where the user select to record it to the other apparatus in S2302, the copy control information analyzer unit 1601 of the content transmitting apparatus 1600 confirm the contents of the content protection information 1700 relating to the selected content (S2304), and determines on whether it is the number-limited copy target content or not (S2305).

And, if a result of the determination is that it is the number-limited copy target content, a specific information, indicating to be "copy can be made with limited number (attached with a number of times of copying)" (for example, uploadingfo=CC_FLAG, CC_COUNT=X), is set into the header portion or the body portion of HTTP (S2306), with using the technology, such as, the DLNA, etc., which was explained previously, and an upload request of the content is transmitted to the content receiving apparatus 100A (S2307).

The content receiving apparatus 100A receiving the upload request, after confirming that the content to be uploaded is attached with the number of times of copying (S2308), turns a response storing an uploading address (for example, a path name or URL (Uniform Resource Locator), for storing the content on the HDD 111) therein, back to the content transmitting apparatus 1600 (S2309).

Figure 24:
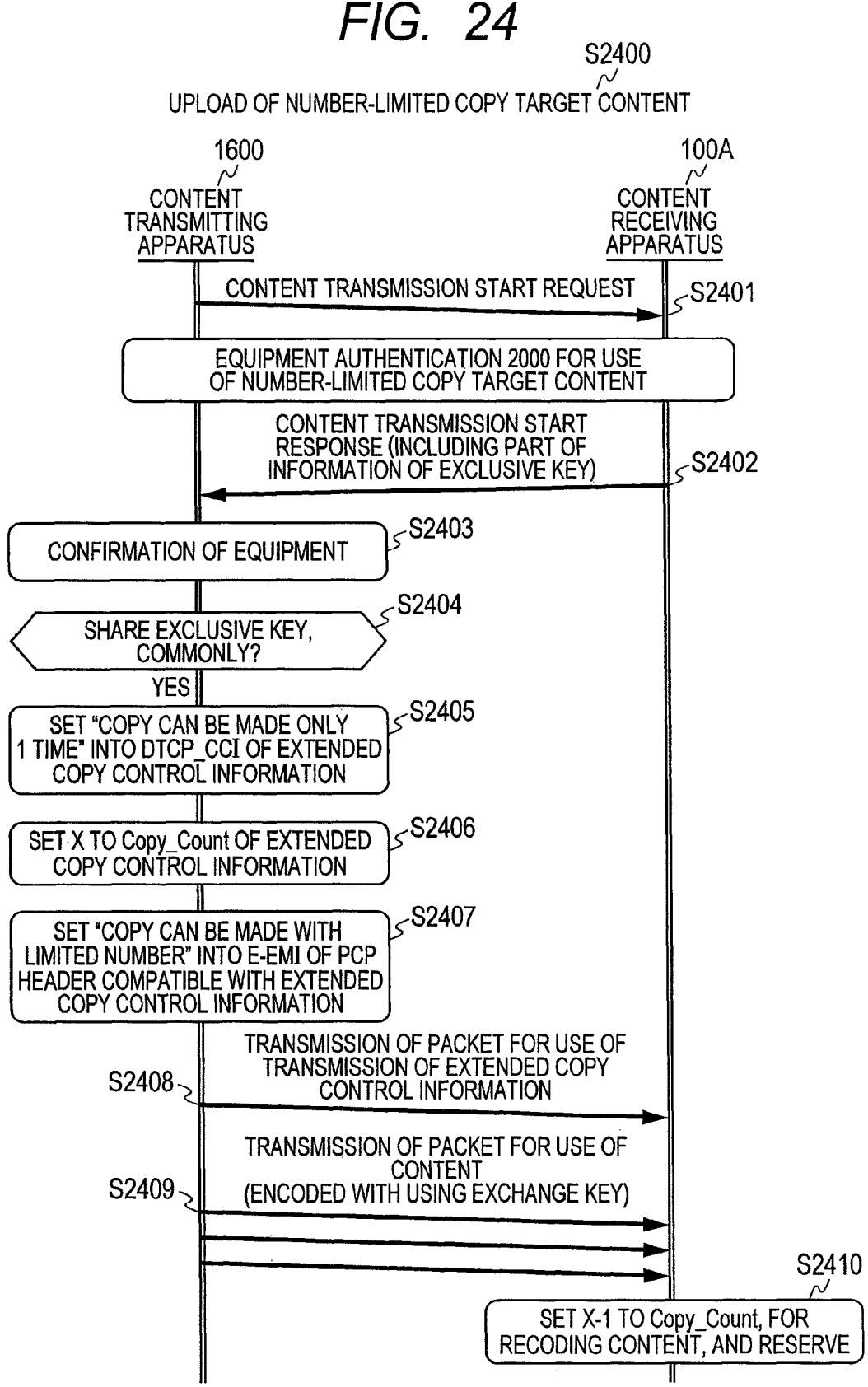
FIG. 24 is a view for showing an example of a sequence of processes for transmitting the content for use of the extended copy control information, for uploading the number-limited copy target content upon "copy of limited-number"

FIG. 24 shows the steps 2400 for the content transmitting apparatus 1600 to transmit the number-limited copy target content, to the content receiving apparatus 100A.

When the content transmitting apparatus 1600 issues a content transmission start request to the uploading address indicated in S2309, with using a POST request of HTTP (S2401), between the content receiving apparatus 100A and the content transmitting apparatus 1600 is executed the equipment authentication process 2000 for use of transmission of the extended copy control information, for sharing the exclusive key, commonly, for transmission of the number-limited copy target content, which is explained in FIG. 20.

Thereafter, the content receiving apparatus 100A installs a part of the information of the exclusive key, which is shared with, commonly, in the equipment authentication process 2000 (for example, Exchange_key_label of the exclusive key or a several number of bits of the exclusive key), and returns a response to the content transmitting apparatus 1600 (S2402).

After the equipment information management unit 209 of the content transmitting apparatus 1600 confirms that the extended copy control receipt permission/refusal of the content receiving apparatus 100A, to be a target within the equipment information table 50, is set to "permission (Yes)" (S2403), then the copy control information analyzer unit 1601 determined on whether "the exclusive key, which can be shared with, commonly, in the equipment authentication process 2000 attached with the number of times of copying" is shared or not, commonly, between the content receiving apparatus 100A (S2404). Herein, since the equipment authentication process 2000 was executed, a result of determination comes to that the exclusive key is shared with.

The copy control information analyzer unit 1601 of the content transmitting apparatus 1600, as is shown in FIG. 31, by referring to the content protection information 1700, which is provided by the content distributor apparatus 1500A or 1500B, sets a value of the digital copy control information 1702, "copy can be made only one (1) generation", into DTCP_CCI 10034 of the extended copy control information 1003 (S2405), and sets a value of the piece number 1706 into "Copy_Count" 10037 (S2406). And then, after setting "copy can be made with limited number" into the E-EMI 8013 of the PCP header enabled to deal with the extended copy control information (S2407), the encoding/decoding processor unit 212 transmits the packet for use of transmission of the extended copy control information (S2408).

Thereafter, it transmits the packet for use of transmission of the content, which is constructed with the header portion indicating that the packet is for use of transmission of the content, by setting the payload type 9017 to "0", and the payload including therein the content encoded with the common key, which is calculated with using the exclusive key (S2409).

The content receiving apparatus 100A decodes the encoded content received, with using the exclusive key, which is shared with, commonly, in the equipment authentication process 2000, and depending on necessity thereof, it is encoded, again, to be recorded on the HDD 111. In that instance, Copy_Count is decremented by "−1" for the recorded content, and it is reserved (S2410).

With the steps mentioned above, it is possible to upload the number-limited copy target content as "copy can be made with limited number", safely, from the content transmitting apparatus 1600 to the content receiving apparatus 100A. Further, about other information, such as, the analog video output control 1703 other than S2205, S2206 and S2207, and the high-speed digital IF output protection 1704, etc., it is assumed that they are determined in accordance with the steps, which are defined by the content distributor apparatus 1500A/1500B.

Herein, explanation will be given on the case where the content receiving apparatus 100C, which is not compatible with the extended copy control information, obtains the content information from the content transmitting apparatus 1600, in accordance with the steps shown in FIG. 18, and after executing the ordinal equipment authentication process 600 between the content transmitting apparatus 1600, in accordance with the steps shown in FIG. 6, it issues a distribution request of the number-limited copy target content to the content transmitting apparatus 1600.

The content transmitting apparatus 1600 confirms that the extended copy control receipt permission/refusal of the content receiving apparatus 100C is set to "permission (Yes)", on accordance with the steps shown by S2103 in FIG. 21.

And, after setting "copy can be made only one (1) generation" into the E-EMI 8013 of the PCP header portion shown in FIG. 8, and a label for identifying the key, which is exchanged in the equipment authentication process 600, into an exchange key label 8014, the content transmitting apparatus 1600 stores the content encoded by the common key, which is calculated with using the exchange key on content transmission packet format 800, into the payload portion 802, and transmits it.

From the above-mentioned, in the present embodiment, the content transmitting apparatus, receiving the number-limited copy target content distributed by the content provider, transmits that content to be "copy can be made only one (1) generation", when transmitting the content to content receiving apparatus, which is not compatible the extended copy control information.

On the other hand, transmitting the content to the content receiving apparatus, which can recognize the extended copy control information, the content transmitting apparatus transmits that content as "copy can be made only one (1) generation" or "copy can be made with limited number", depending on a kind of the key, which is shared with, commonly, as a result of the equipment authentication process executed between the content receiving apparatus.

Also, the content receiving apparatus, when not necessary the content by itself, executes the equipment authentication process for use of transmission of the extended copy control information, and stores the information relating to the exchange key, which is shared with, commonly, in the equipment authentication process for use of transmission of the extended copy control information, in a part of the content transmission request; thereby receiving the content as "copy can be made only one (1) generation" from the content transmitting apparatus.

When recording the content by the apparatus itself, it executes the equipment authentication process for use of the number-limited copy target content, and stores the information relating to the exclusive key, which is shared with, commonly, in the equipment authentication process for the number-limited copy target content, into the content transmission request; thereby receiving it as "copy can be made with limited number" from the content transmitting apparatus.

With this, for the apparatus, which cannot deal with the number-limited copy target content, it is possible to allow that apparatus to record it only one time, as "copy can be made only one (1) generation", and also for the apparatus, which can deal therewith, it is possible to transmit that content, safely, as "copy can be made with limited number", only when there is necessity of recording therein.

Embodiment 4

In the embodiment 3 mentioned above, the explanation was given about the steps for distributing the number-limited copy target content. In the present embodiment 4, explanation will be given about a method for transmitting the copy control information, with certainty, in particular, when the copy control information changes on the way of transmission of the content, following to this.

Figure 25:
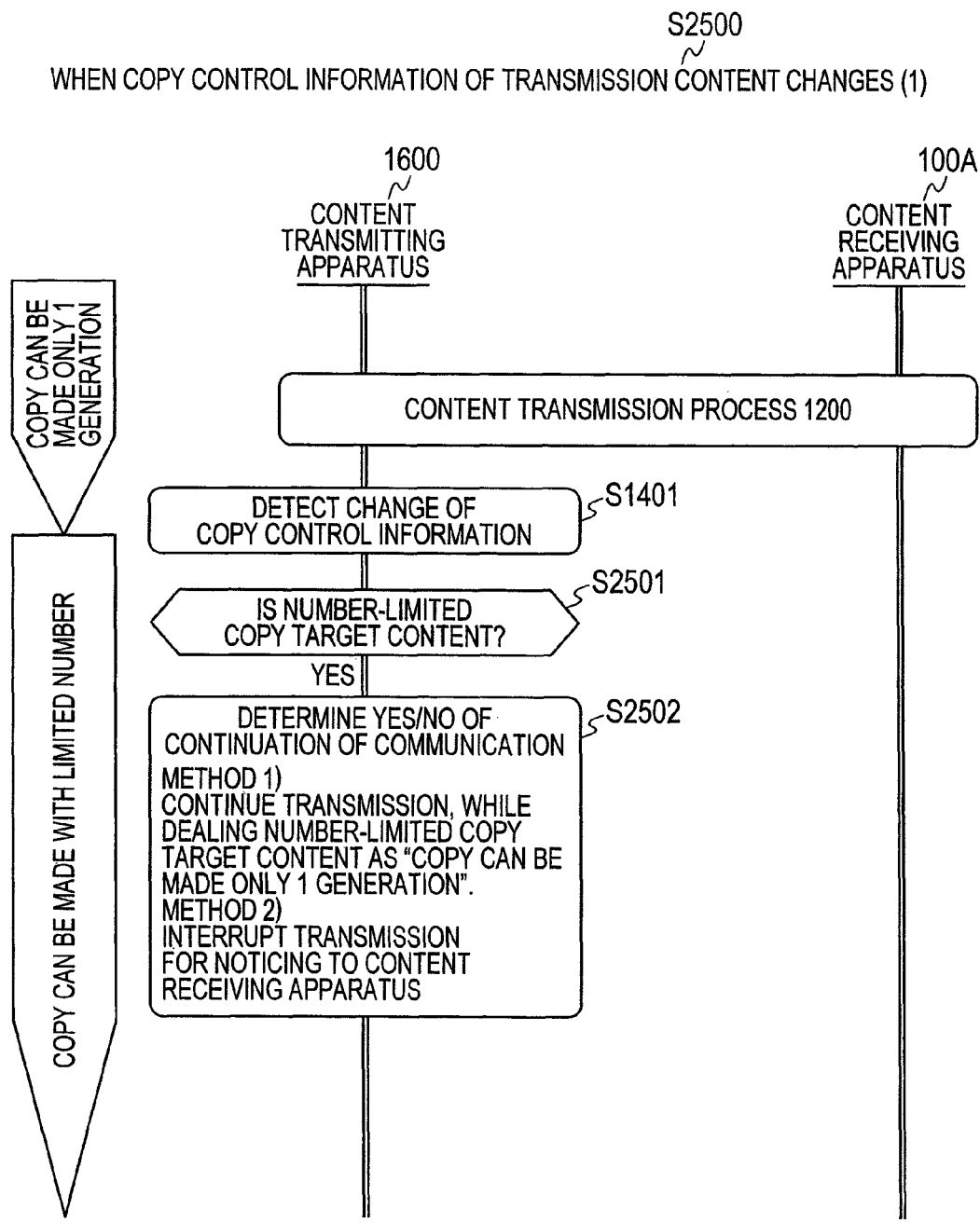
FIG. 25 is a view for showing an example of a sequence of processes for transmitting the content for use of the extended copy control information when the copy control information changes on the way of the content.

FIG. 25 shows steps of operations 2500 of the content transmitting apparatus 1600, in case where the content of "copy can be made only one (1) time" changes to the content of "copy can be made with limited number" during when the content transmitting apparatus 1600 transmit it to the content receiving apparatus 100A, due to exchange of the content or channel operation, etc., after executing the equipment authentication process 700 for use of transmission of the extended copy control information.

First of all, it is assumed that the content transmission process 1200, which was explained previously, is executed between the content transmitting apparatus 1600 and the content receiving apparatus 100A, thereby transmitting the content of "copy can be made only one (1) time".

Under this condition, similar to S1401 in FIG. 14, when detecting change of the copy control information of the transmission content, the copy control information analyzer unit 1601 of the content transmitting apparatus 1600 decides on if the content after the change is attached with the number of times of copying or not (S2501), and if it is attached with the number of times of copying, it determines on whether the transmission thereafter should be continued or not (S2502).

Herein, the content transmitting apparatus 1600 treats the number-limited copy target content as "copy can be made only one (1) time" in S2502, when it is possible to grasp, in advance, that the content receiving apparatus 100A is not the recording apparatus (for example, TV), or that there is no schedule of recording the number-limited copy target content after the change (not set in the recording reservation), and thereby continuing the transmission.

For the purpose of grasping the condition mentioned above, it is enough to utilize the DLNA technology or an AV command of IEEE 1394, etc., which are explained previously.

Also, the content transmitting apparatus 1600, if it has no means for obtaining information about the operation of the content receiving apparatus 100A, interrupts the transmission, once, for noticing that the content changes to "copy can be made with limited number", for example, destroying TCP connection in S2502, or indicating stop of reception of the content with using the DLNA technology, etc.

With this, the operation of the content receiving apparatus 100A can be selected, such as, executing the content transmission process 1200, which was explained previously, again, when receiving the content as "copy can be made only one (1) time", or executing the equipment authentication process 2000 for use of transmission of the number-limited copy target content, when trying to receive it as "copy can be made with limited number", and thereby to obtain the exclusive key, etc.

Figure 26:
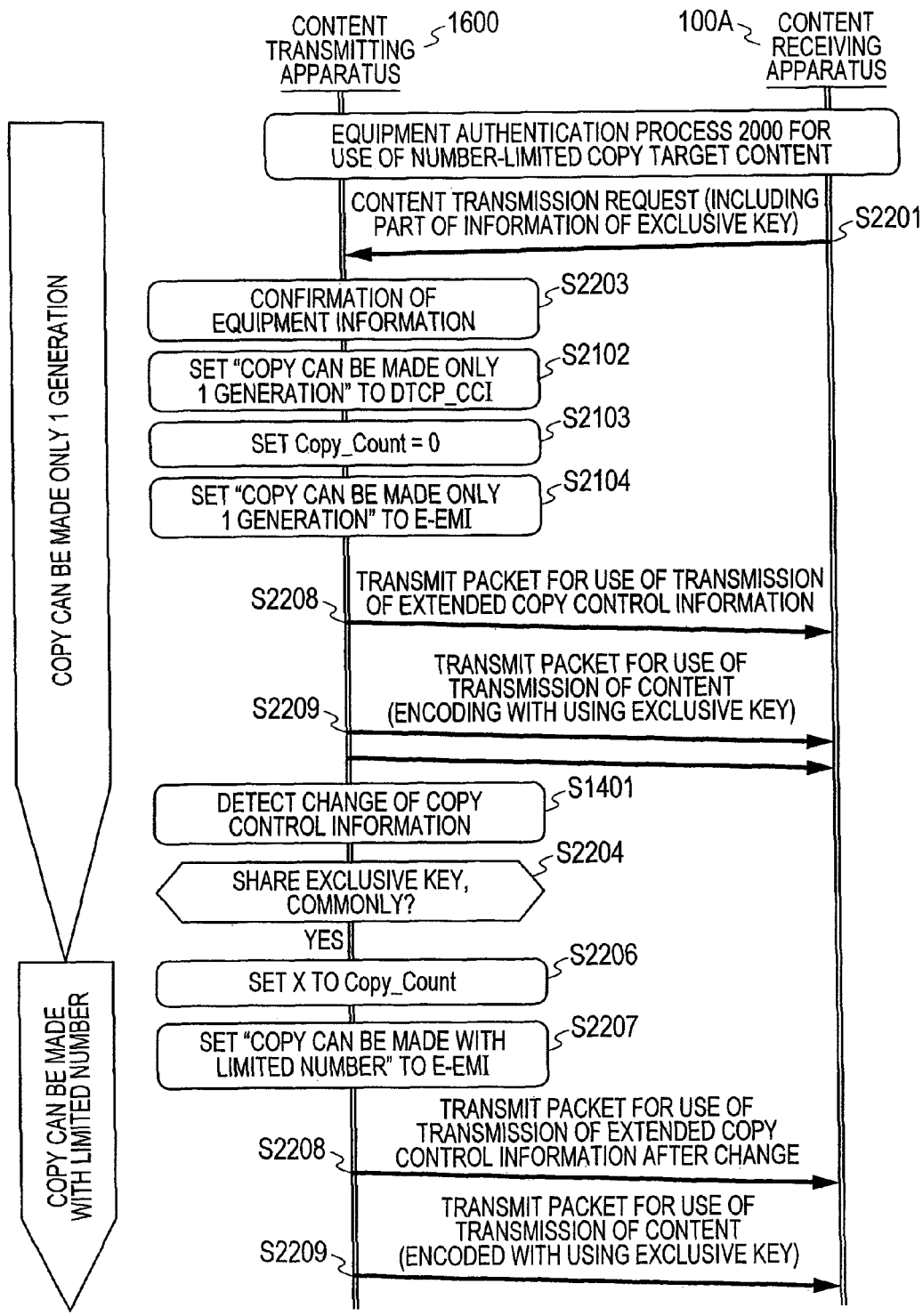
FIG. 26 is a view for showing an example of a sequence of processes for transmitting the content for use of the extended copy control information when the copy control information changes on the way of the content.

FIG. 26 shows an example of steps of operations 2600 to be executed by the content transmitting apparatus 1600, when the content changes to that of "copy can be made with limited number" due to exchange of the content or the channel operation, during when the content transmitting apparatus 1600 transmits the content of "copy can be made only one (1) time" to the content receiving apparatus 100A, after executing the equipment authentication process 2000 for use of transmission of the extended copy control information, in particular, for use of that attached with the number of times of copying.

The difference between FIG. 15 lies in an aspect that the exclusive key is shared with, in advance, commonly, between the content transmitting apparatus 1600 and the content receiving apparatus 100A.

The content receiving apparatus 100A, as is explained by referring to FIG. 22, issues the content transmission request, which includes a part of the information of the exclusive key therein, to the content transmitting apparatus 1600 (S2201).

Responding to this, the content transmitting apparatus 1600, after transmitting the confirmation of receipt thereof, confirms that the extended copy control information reception permission/refusal of the content receiving apparatus 100A is in "permission (Yes)" (S2203), and thereafter, as is mentioned in the explanation of FIG. 21, and sets the value "10:copy can be made only one (1) time" of the digital copy control information 1702 into the DTCP_CCI 10034 of the extended copy control information (S2102), and the value of "0" into the Copy_Count 10037 (S2103), by referring to the content protection information 1700, which is provided by the content distributor apparatus 1500A or 1500B, within the copy control information analyzer unit 1601.

And, after setting the "1000: copy can be made only one (1) generation into E-EMI 8013 of the PCP header compatible with the extended copy control information (S2104), the encoding/decoding processor unit 212 transmits the packet for use of transmission of the extended copy control information (S2208). Following to the above, it transmits the packet for user of transmission of the content, being constructed with the payload including the content encoded by the common key, which is calculated with using the exclusive key (S2209).

Next, similar to S1401 in FIG. 14, the content transmitting apparatus 1600, when detecting change of the copy control information of the transmission content, determines on whether the exclusive key is shared with or not, commonly, between the content receiving apparatus 100A (S2204), and if the exclusive key is already shared with; commonly, it sets the value of the piece number 1706 into Copy_Count 10037 of the extended copy control information 1003, by referring to the content protection information 1700, which is provided by the content distributor apparatus 1500A or 1500B (S2206).

And, after setting "0011: copy can be made with limited number" into the E-EMI 8013 of the PCP header compatible with the extended copy control information (S2204), it transmits the packet for use of transmission of the extended copy control information after the change (S2208). Following to the above, similar to S2209, it transmits the packet for use of transmission of the content, being constructed with the payload including the content encoded by the common key, which is calculated with using the exclusive key (S2209).

From the mentioned above, for the content transmitting apparatus trying to record the number-limited copy target content therein, if executing the equipment authentication process 2000, in advance, thereby sharing the exclusive key, commonly, it is possible to continue the transmission of the content, smoothly, even when the content changes into the number-limited copy target content on the way of transmission thereof.

Figure 27:
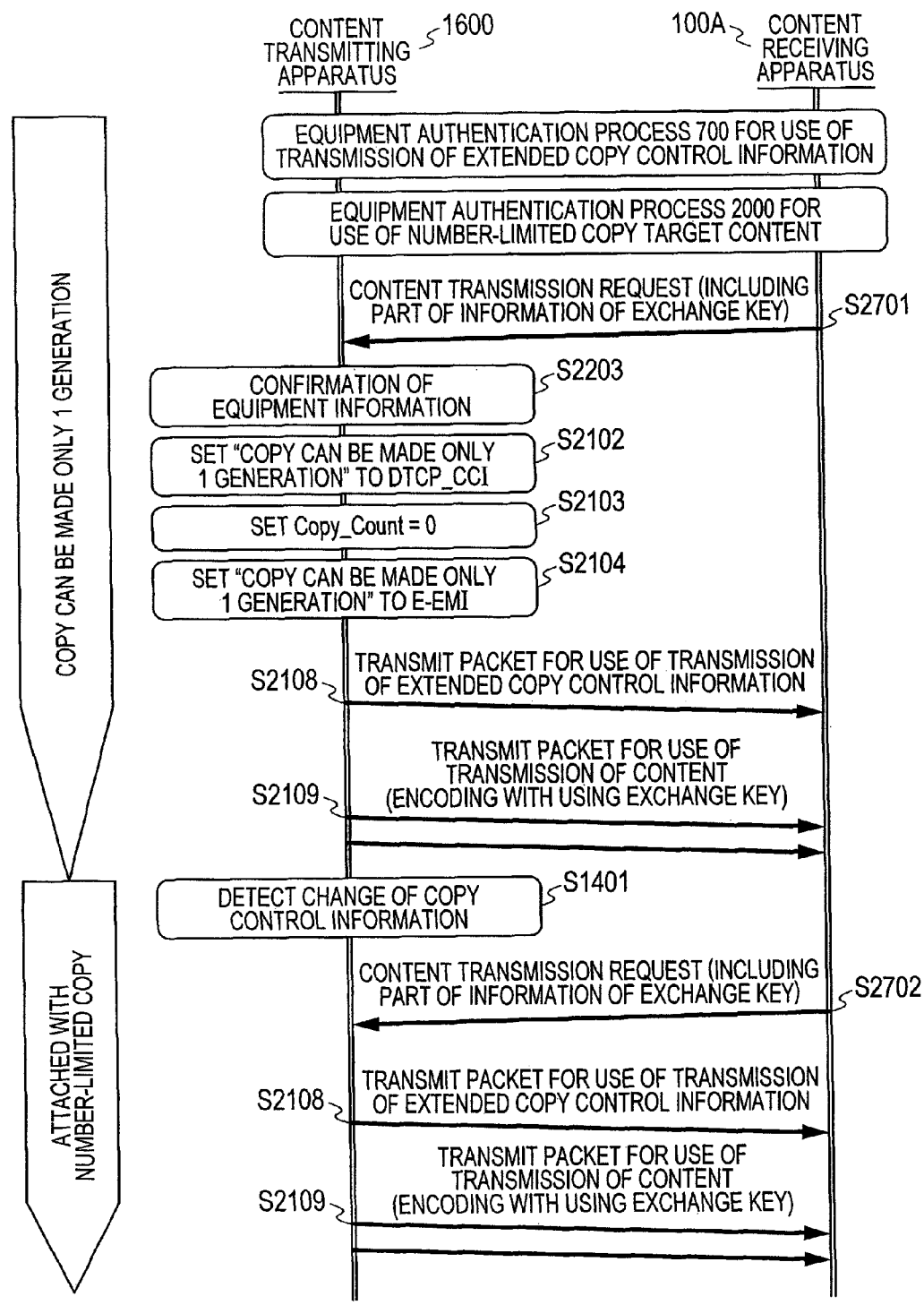
FIG. 27 is a view for showing an example of a sequence of processes for transmitting the content for use of the extended copy control information when the copy control information changes on the way of the content.

FIG. 27 shows an example of steps of operations 2700 executed by the content transmitting apparatus 1600, when the content changes into that of "copy can be made with limited number" due to exchange thereof or the channel operation, during when the content transmitting apparatus 1600 transmits the content of "copy can be made only one (1) generation" to the content receiving apparatus 100A, after executing the equipment authentication process 700 for use of transmission of the extended copy control information and the equipment authentication process 2000 for use of transmission of the extended copy control information attached with the number of times of copying.

The difference between FIG. 25 and FIG. 26 lies in an aspect that both the exchange key and the exclusive key are shared with, in advance, commonly, between the content transmitting apparatus 1600 and the content receiving apparatus 100A.

The content receiving apparatus 100A, when it selects the content received with using the steps shown in FIG. 18, and if that content is of "copy can be made only one (1) generation", installs a part of the information of the exchange key (for example, Exchange_key_label of the exchange key or a several number of bites of the exchange key), which is shared with, commonly, in the equipment authentication process 700, into the GET request of HTTP, etc., and issues the content transmission request to the content transmitting apparatus 1600 (S2701).

Responding to this, the content transmitting apparatus 1600, after transmitting the confirmation of receipt thereof, confirms that the extended copy control information receipt permission/refusal of the content receiving apparatus 100A is "permission (Yes)" (S2203), and thereafter, it sets the value "10*copy can be made only one (1) generation" of the digital copy control information into the DTCP_CCI 10034 of the extended copy control information (S2102), and sets the value of "0" into Copy_Count 10037 (S2103).

And, after setting "1000: copy can be made only one (1) generation" into the E-EMI 8013 of the PCP header compatible with the extended copy control information (S2104), it transmits the packet for use of transmission of the extended copy control information (S2108), and thereafter, transmits the packet for use of transmission of the extended copy control information (S2108). Following to the above, it transmits the packet for use of transmission of the content, being constructed with the payload including the content encoded by the common key, which is calculated with using the exclusive key (S2109).

Herein, similar to S1401 in FIG. 14, the content transmitting apparatus 1600, when detecting change of the copy control information of the transmission content, determines on whether the exclusive key is shared with or not, commonly, between the content receiving apparatus 100A, similar to S2204 in FIG. 26.

And, similar to S2206 to S2207 in FIG. 26, it sets predetermined values into the Copy_Count 10037 of the extended copy control information 1003 and E-EMI 8013 of the PCP header compatible with the extended copy control information, and transmits the packet for use of transmission of the extended copy control information after the change. Following to the above, it transmits the packet for use of transmission of the content including the content encoded by the common key, which is calculated with using the exchange key.

Responding to that, the content receiving apparatus 100A, if not recording the content after the change therein, establishes TCP connection, again, if necessary, after destroying the TCP connection for use of transmission of the content, once, and issues the content transmission request installing a part of the information of the exchange key, similar to S2701, to the content transmitting apparatus 1600 (S2702).

The content transmitting apparatus 1600, receiving the transmission request, sets predetermined values into the Copy_Count 10037 of the extended copy control information 1003 and E-EMI 8013 of the PCP header compatible with the extended copy control information, changing "copy can be made with limited number" to "copy can be made only one (1) generation", and transmits the packet for use of transmission of the extended copy control information. Following to the above, it transmits the packet for use of transmission of the content including the content encoded by the common key, which is calculated with using the exchange key.

Form the above-mentioned, the content receiving apparatus is able to control to receive the number-limited copy target content, as "copy can be made with limited number" or as "copy can be made only one (1) generation", by executing the equipment authentication processes 700 and 2000, in advance, and thereby sharing the exchange key and the exclusive key, commonly.

Herein, in S2702, after the copy control information of the content is exchanged, the content transmitting apparatus 1600 issues the content transmission request, after starting the content transmission, with using the exclusive key. As other method, the content transmission request S2702 may be issued, beforehand, if knowing the copy control information of the content, to which the content changes, by selecting a button 1908 for obtaining the content, which is scheduled to be distributed in FIG. 19, or obtaining the EPG through the Internet 2, in advance.

Next, by referring to FIG. 28, explanation will be given on an example of the processing steps when a request for obtaining the content information is issued from the content receiving apparatus 100B, during when the number-limited copy target content is transmitted between the content transmitting apparatus 1600 and the content receiving apparatus 100A.

During the transmission of the number-limited copy target content (S2200), with using the exclusive key, which is shared with between the content transmitting apparatus 1600 and the content receiving apparatus 100A, similar to S1801 described in FIG. 18, the request for obtaining the content information is issued from the content receiving apparatus 100B to the content transmitting apparatus 1600 (S2801).

The content transmitting apparatus 1600, receiving the obtaining request, obtains the information relating to the content, which can be received from the tuner 201 or through the digital input/output terminals 214 from the content distributor apparatus A 1500A or the content distributor apparatus B 1500B, and it also determines on whether there is the number-limited copy target content or not, among the contents under the transmission thereof by the apparatus itself (S2802).

In this instance, since the content is already under the transmission thereof to the content receiving apparatus 100A, the copy control information analyzer unit 1601 of the content transmitting apparatus 1600 installs a specific information indicating "copy is inhibited" or "copy cannot be made again" into the information relating to the number-limited copy target content under the transmission thereof, in particular, into the header portion or the body portion of the HTTP, while confirming the contents of the copy control information 1700 attached to each of the contents (S2803).

And, it transits each content information to the content receiving apparatus 100B (S2804).

Figure 29:
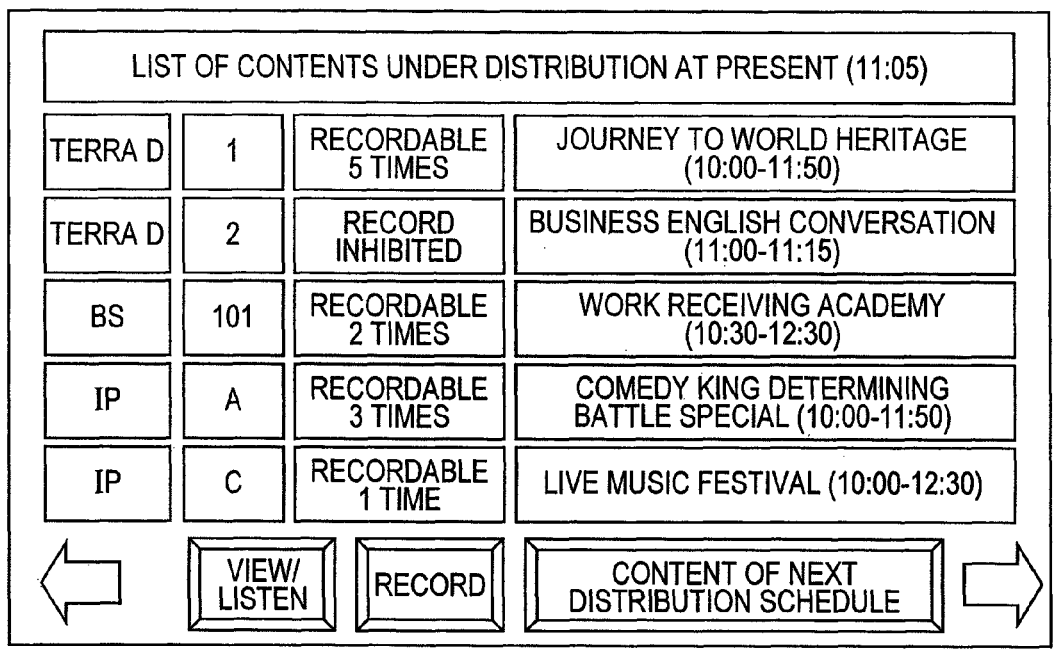
FIG. 29 is a view for showing an example of the structures of a display screen of the content list.

The content receiving apparatus 100B receiving the content information displays the screen 2900 of the content list as shown in FIG. 29. On the screen 2900 of the content list, the number-limited copy target content under the transmission thereof is displayed as "recording inhibited" (business English conversation).

When the user selects the number-limited copy target content under the transmission thereof, on the screen 2900 of the content list, the equipment authentication proves 700 for use of transmission of the content, which was explained previously, is executed between the content receiving apparatus 100B and the content transmitting apparatus 1600.

Thereafter, when the content receiving apparatus 100B issues the request for transmitting the number-limited copy target content to the content transmitting apparatus 1600 (S2806), the content transmitting apparatus 1600, while changing the content to "copy inhibited", sets "11: copy inhibited" (or, "01: copy cannot be made again") into the DTCP_CCI 10034 of the extended copy control information 1003 (S2807), and sets "1100: copy inhibited" (or "0100: copy cannot be made again") into the E-EMI 8013 of the PCP header compatible with the extended copy control information (S2808). And, it transmits the packet for transmission of the extended copy control information (S2809), and following thereto, it transmits the packet for use of transmission of the content including the content encoded by the common key, which is calculated with using the exchange key (S2810).

Form the mentioned-above, if the request for transmitting the content is issued from other content receiving apparatus, during when the content transmitting apparatus 1600 is already in the condition of transmitting the number-limited copy target content, that content is transmitted as "copy inhibited". With this, it is possible to control the number of times of copying, correctly.

Herein, description is made that the content information obtaining and/or the content transmission request is/are issued, mainly, from the content receiving apparatus, in the present embodiment; however, as shown in FIGS. 23 to 24, execution of the similar steps can be made from the content transmitting apparatus.

Embodiment 5

In the present embodiment, explanation will be made on an example of the method for distributing the number-limited copy target content received from the content distributor apparatus 1500A or 1500B, to plural numbers of content receiving apparatuses.

After executing communication of the content information between the content transmitting apparatus 1600 and the content receiving apparatus 100A, in accordance with the steps explained in FIG. 18 (S1801 to S1806), the content receiving apparatus 100A display the screen 1900 of the content list, which was explained in FIG. 19.

Figure 30:
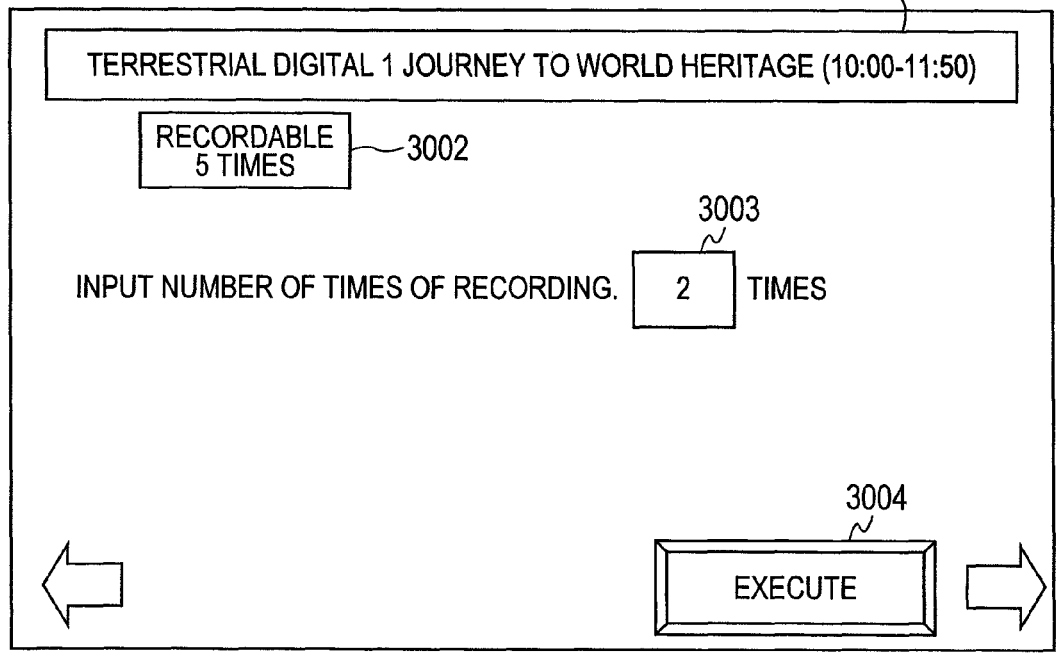
FIG. 30 is a view for showing an example of the structures of the display screen of the content list.

When the user selects the number-limited copy target content (for example, "Journey to World Heritage (10:00-11:50)" of terra D), and indicates the [record] button 1904, on the screen 1900 of the content list, then such a screen 3000 as shown in FIG. 30 is displayed.

On the screen 300 are displayed a title 3001 of the content selected, a number of times 3002 of copying, which is allowed for that content (recoding can be made 5 times in FIG. 30), a number of times 3003 of recording to be recorded into the apparatus itself among the number of times 3002 of copying, and an [execute] button 3004.

The user sets a right of number of times of copying to be added to the content, which will be recorded onto the HDD 111 of the content receiving apparatus 100A into the number of times 3003 of recording (2 times in FIG. 30), on the screen 3000, and then indicates the [execute] button 3004.

The content receiving apparatus 100A, after executing the equipment authentication process 2000 in accordance with the steps explained in FIG. 22, issues the content transmission request including a part of the information of the exclusive key to the content transmitting apparatus 1600, as is in S2201. In this instance, the value set into the number of times 3003 of recording (2 times) is included within the content transmission request.

The content transmitting apparatus 1600, after transmitting the confirmation of receipt responding to the content transmission request, executes S2203-S2205, which are explained in FIG. 22, and confirms that the value of the number of times 3003 of recording included in the content transmission request is equal or less than a value of the piece number 1706 of the content protection information 1700, and thereafter sets the value of the number of times 3003 of recording into the Copy_Count 10037 of the extended copy control information in S2206.

And, it encodes the content by the common key, which is calculated with using the exclusive key, as is shown in S2208-S2209, and transmits it.

The content receiving apparatus 100A, as is explained in S2210, decodes the encoded content received, by the common key, which is calculated with using the exclusive key, and records it onto the HDD 111, if necessary, after coding it, again. In that instance, it reserves the Copy_Count after decrementing by "−1" (1 time) for the content recorded.

Figure 28:
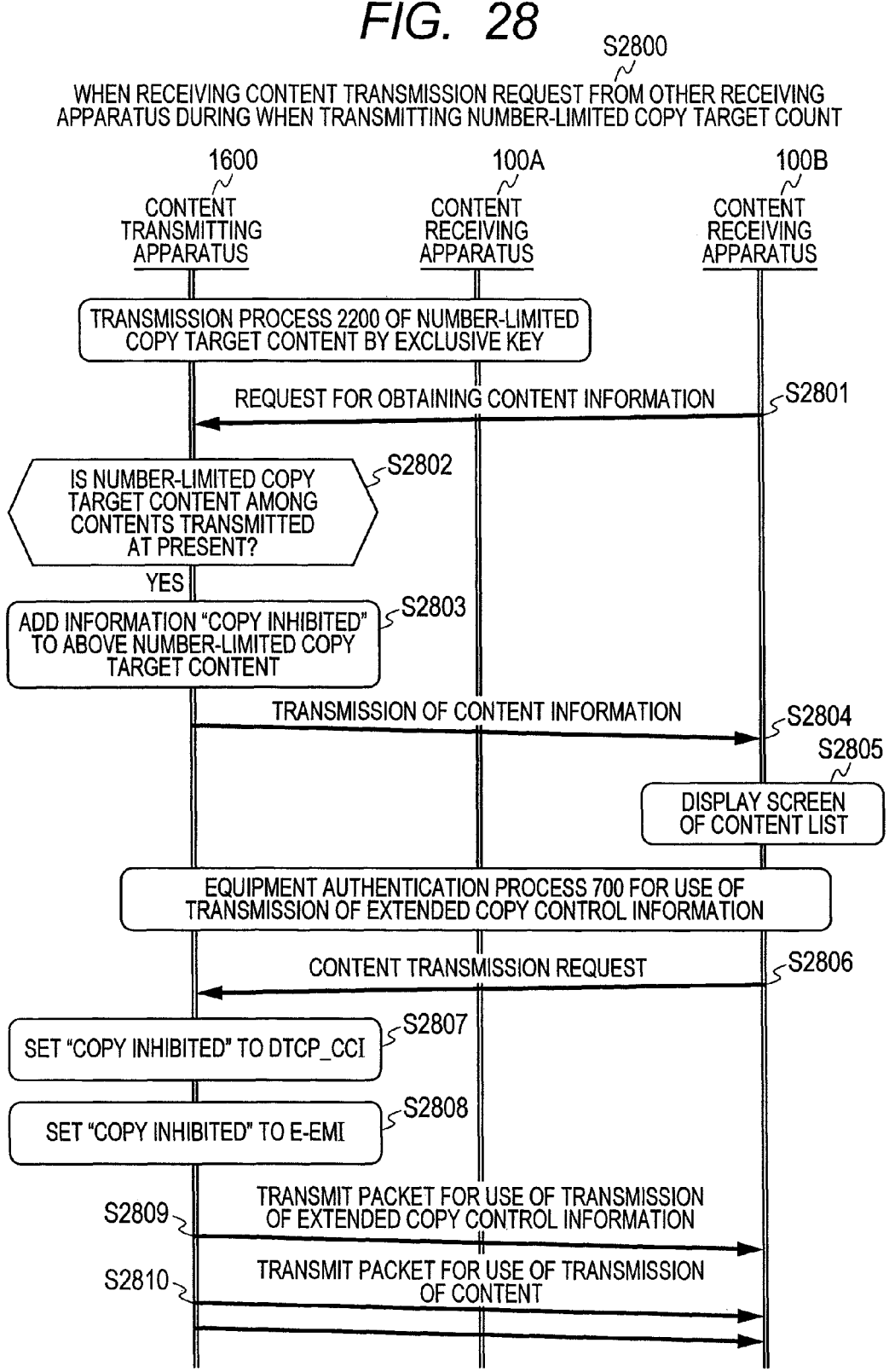
FIG. 28 is a view for showing an example of a sequence of processes, when receiving a command for obtaining the content information from other content receiving apparatus during when transmitting the number-limited copy target content.

When other content receiving apparatus 100B obtains the content information from the content transmitting apparatus 1600, in accordance with the steps shown in FIG. 28, during when the transmission of the number-limited copy target content is executed between the content transmitting apparatus 1600 and the content receiving apparatus 100A in accordance with the steps explained previously, a value (3 times) obtained by decrementing the value of the piece number 1706 (5 times) of the content protection information 1700 by the number of times 3003 of recording (2 times) is displayed in the number of times of recording relating to the number-limited copy target content on the screen 2900 of the content list, which is displayed in S2805.

With the mentioned-above, it is possible to distribute the number-limited copy target content, which is received from the content distributor apparatus 1500A or 1500B, to the plural numbers of content receiving apparatuses.

Herein, description is made that the content information obtaining and/or the content transmission request is/are issued, mainly, from the content receiving apparatus, in the present embodiment; however, as shown in FIGS. 23 to 24, execution of the similar steps can be made from the content transmitting apparatus.

Embodiment 6

In the present embodiment, explanation will be made, assuming that the content protection information 1700 to be added to the number-limited copy target content by the content distributor A/B has the following elements:
the copy control method 1701=01 (execute DTCP protection)
the digital copy control information 1702=11 (copy inhibited) or 01 (copy cannot be made again)
the number-limited copy 1705=1 (applying the number-limited copy permission)
the piece number=1 or more than that In FIG. 32 is shown a relationship between the content protection information 1700 relating to the content distributed by the content distributer 1500A or 1500B, and the extended copy control information 1003 to be transmitted with it, when the content transmitting apparatus 1600, receiving the content thereon, transmits that content the other content receiving apparatus 100A/100B.

However, though not described in FIG. 32, into APS 10036 is set a value of the analog video output control 1703, and into Copy_Count 10037 is set a value of the piece number 1706, respectively.

Also, it is assumed that, into Retention_Move_Mode 10031, Retention_State 10032 and Image_Constraint_Token 10035 are set the value, which is already defined by the content distributor apparatus 1500A or 1500B, or a value referring to the content protection information 1700 having the items mentioned above.

Further, although explanation was made that as "copy can be made within limited-number" to be set into E-EMI 9013 is "0011: Copy Count"; however, it may be, for example, "0110: Move", but other than the values, "0000: No encoding", "0010: Copy free with EPN", "0100: No more copies", "1000/1010: Copy one generation" and "1100: Copy never".

The content transmitting apparatus 1600 receiving the member-limited copy target content distributed by the content distributor 1500A/1500B sets "copy inhibited" into the E-EMI 8013 within the header portion 801 of the content transmission format 800 shown in FIG. 8, when transmitting the content to the content receiving apparatus 100C, which is unable to deal with the extended copy control information 1003, and after storing the content encoded by the common key calculated from the exchange key, which is shared with, commonly, in the ordinal equipment authentication process 600, into the payload portion 802, transmit it.

On the other hand, if the equipment authentication process for use of transmission of the extended copy control information is already executed between the content receiving apparatus, when it transmits the content to the content receiving apparatus 100A/100B, which can recognize the extended copy control information, the content transmitting apparatus 1600 sets "copy inhibited" into the DTCP-CCI 10034 of the extended copy control information 1003 shown in FIG. 10, as well as, setting "copy inhibited" into the E-EMI 9013 of the PCP header 901 compatible with the extended copy control information shown in FIG. 9, and stores the content encoded by the common key calculated from the exchange key, which is shared with, commonly, in the equipment authentication process 700, into the payload portion 902, thereby transmitting it.

When executing the equipment authentication process 2000 for use of the number-limited copy target content between the content receiving apparatus, it sets "11: copy inhibited" into the DTCP-CCI 10034 of the extended copy control information 1003, and sets the value of the piece number 1706 into Copy_Count 10034, and further sets "0011: copy can be made with limited number" into the E-EMI 9013 of the PCP header 901 compatible with the extended copy control information. And, it stores the content encoded by the common key calculated from the exclusive key, which is shared with, commonly, in the equipment authentication process 2000, into the payload portion, and transmits it.

From the above-mentioned, it is possible to transmit the number-limited copy target content as "copy inhibited" to the apparatus, which cannot deal with it, and to transmit it as "copy can be made with limited number" to the apparatus, which cannot deal with it, only when recoding thereof is necessary, with safety.

However, the present invention should not be limited to the embodiments mentioned above, but may includes various variations thereof. For example, the embodiments mentioned above are explained in details thereof, for easily explaining the present invention; therefore, the present invention should not be limited to comprise all constituent elements therein, necessarily. Also, a part of the constituent elements of a certain embodiment may be replaced with the constituent element of other embodiment, or to the constituent elements of a certain embodiment may be added the constituent element(s) of the other embodiment. Also, in a part of the constituent elements of each embodiment, it is possible to make addition/deletion/replacement of other constituent element(s).

Also, with each constituent element, function, processing unit, processingmeans, etc., mentioned above, a part or all thereof may be achieved with hardware, such as, by designing it with a integrated circuit, etc. Also, each constituent element or function, etc., mentioned above may be achieved in the form of software, wherein a processor interprets programs for achieving the respective functions and executes them. The information of the programs, tables or files, etc., for achieving each function may be located in a recording device, such as, a memory, a hard disc, a SSD (Solid State Drive), etc., or a recoding medium, such as, an IC card, a SD card, a DVD, etc.

Also, control lines and/or information lines are shown, which can be considered to be necessary for the explanation, but all of the control lines and the information lines, which are necessary for a product, are not shown, necessarily. Actually, it can be considered that almost of all constituent elements are connected, mutually, with each other.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A content transmission apparatus which is configured to transmit content to a content reception apparatus, comprising:
   a communication processor unit configured to transmit/receive the content and a control command as a source/destination of the content to/from the content reception apparatus;
   an authentication unit configured to execute a first authentication process and a second authentication process,
      the first authentication process authenticating the content reception apparatus to share a first exchange key with the content reception apparatus via the communication processor unit when the content reception apparatus sends an authentication request for use of content which is not attached with a permission to make a plural number of copies to the content transmission apparatus,
      the second authentication process authenticating the content reception apparatus to share a second exchange key with the content reception apparatus via the communication processor unit when the content reception apparatus sends an authentication request for use of content which is attached with permission to make a plural number of copies to the content transmission apparatus;
   a timer configured to measure a time interval from when issuing a confirmation request for confirming that the content reception apparatus is in-house to when receiving the receipt of the request from the content reception apparatus during the first authentication process or the second authentication process;
   an encoding processor unit configured to execute an encryption process on the content of the content transmission apparatus to be transmitted to the content reception apparatus with key information generated based on the first exchange key or the second exchange key; and
   a controller unit configured to control the communication processor unit, the authentication unit, the timer, and the encoding processor unit,
   wherein the controller unit is configured to:
   control the authentication unit to execute the second authentication process when receiving the authentication request for use of the content which is attached with permission to make a plural number of copies and to execute the first authentication process when receiving the authentication request for use of the content which is not attached with permission to make a plural number of copies, and
   control the encoding processor unit to generate the key information based on the second exchange key to transmit the content which is attached with permission to make a plural number of copies when the content transmission apparatus receives the request for transmitting the content from the content reception apparatus which has been authenticated by the second authentication process and which shares the second exchange key, and to generate the key information based on the first exchange key to transmit the content which is not attached with permission to make a plural number of copies when the content transmission apparatus receives the request for transmitting the content from the content reception apparatus which has been authenticated by the first authentication process and which shares the first exchange key.

2. A content reception apparatus which is configured to receive content from a content transmission apparatus, comprising:
   a communication processor unit configured to transmit/receive the content and a control command as a source/destination of the content to/from the content transmission apparatus;
   an authentication unit configured to execute a first authentication process and a second authentication process,
      the first authentication process authenticating the content transmission apparatus to share a first exchange key with the content transmission apparatus via the communication processor unit when the content reception apparatus sends an authentication request for use of content which is not attached with permission to make a plural number of copies to the content transmission apparatus,
      the second authentication process authenticating the content transmission apparatus to share a second exchange key with the content transmission apparatus via the communication processor unit when the content reception apparatus sends an authentication request for use of content which is attached with permission to make a plural number of copies to the content transmission apparatus;

a timer configured to measure a time interval from when issuing a confirmation request for confirming that the content reception apparatus is in-house to when receiving the receipt of the request from the content reception apparatus during the first authentication process or the second authentication process;

a decoding processor unit configured to execute a decryption process on the content reception apparatus to be received from the content transmission apparatus with key information generated based on the first exchange key or the second exchange key; and a controller unit configured to control the communication processor unit, the authentication unit, and the decoding processor unit, wherein the controller unit is configured to:

control the authentication unit to send the authentication request for use of the content which is attached with permission to make a plural number of copies to the content transmission apparatus and to execute the second authentication process, and to send the authentication request for use of the content which is not attached with permission to make a plural number of copies to the content transmission apparatus and to execute the first authentication process, and control the decoding processor unit to generate the key information based on the second exchange key when receiving the content which is attached with permission to make plural number of copies from the content transmission apparatus, and to generate the key information based on the first exchange key when receiving the content which is not attached with permission to make a plural number of copies from the content transmission apparatus.

* * * * *